(12) United States Patent
Omiya et al.

(10) Patent No.: US 6,412,822 B1
(45) Date of Patent: Jul. 2, 2002

(54) ROTARY JOINT

(75) Inventors: Junyi Omiya; Masato Wada, both of Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 09/403,200

(22) PCT Filed: Nov. 30, 1998

(86) PCT No.: PCT/JP98/05394

§ 371 (c)(1),
(2), (4) Date: Oct. 15, 1999

(87) PCT Pub. No.: WO99/42748

PCT Pub. Date: Aug. 26, 1999

(30) Foreign Application Priority Data

| Feb. 18, 1998 | (JP) | 10/035688 |
| Mar. 12, 1998 | (JP) | 10/082763 |
| Mar. 12, 1998 | (JP) | 10/082764 |
| Apr. 3, 1998 | (JP) | 10/092099 |
| Apr. 3, 1998 | (JP) | 10/092100 |
| Jun. 22, 1998 | (JP) | 10/174302 |

(51) Int. Cl.⁷ .............................................. F16L 27/00
(52) U.S. Cl. ................. 285/121.3; 285/41; 285/140; 285/121.12; 277/937; 277/941
(58) Field of Search ........................ 285/121.3, 121.12, 285/41, 140; 277/941, 939

(56) References Cited

U.S. PATENT DOCUMENTS

| 3,573,874 A | * | 4/1971 | Hill et al. | 277/444 |
| 3,624,809 A | * | 11/1971 | Beninga | 277/405 |
| 5,022,686 A | * | 6/1991 | Heel et al. | 285/134 |
| 5,199,748 A | * | 4/1993 | Jung et al. | 285/136 |
| 5,303,936 A | * | 4/1994 | Kuroki | 277/165 |
| 5,472,216 A | * | 12/1995 | Albertson et al. | 277/165 |
| 6,142,478 A | * | 11/2000 | Pecht et al. | 277/400 |

* cited by examiner

Primary Examiner—Kathy Matecki
Assistant Examiner—Carlos Lugo
(74) Attorney, Agent, or Firm—Griffin & Szipl, P.C.

(57) ABSTRACT

A mechanical seal rotary joint of the end-face contact type which permits slurry fluids, such as polishing solution, to pass through a fluid passage without leaking out of the relatively rotating contact area therein. The rotary joint of the present invention comprises: a first joint body (1); a second joint body (2) connected rotatably to the first joint body (1); a prime seal unit (3) provided between the opposed end portions (11, 21) of the two joint bodies (1, 2); and a continuous line of prime fluid passage (6). The prime seal unit (3) is a mechanical seal comprising: a stationary seal ring (30) fixed on the end portion (21) of the second joint body (2) concentrically with the axis of rotation as its center; a movable seal ring (31) held on the end portion (11) of the first joint body (1) and concentric with and opposite to the stationary seal ring (30); a rotation stopper (32a) provided on the outer circumferential side of the movable seal ring (31) for preventing the relative rotation of the seal ring (31) while allowing the seal ring (31) to move in the axial direction; and springs (33a) to thrust and press the movable seal ring (31) against the stationary seal ring (30). Thus, the prime seal unit (3) is constructed so as to provide a seal between the inner circumferential region (3a) and the outer circumferential region (3b) of the two seal rings (30, 31). The prime fluid passage (6) is made up of the inner circumferential regions (3a) of the two seal ring (30, 31), a first primary passage section (60) passing through the first joint body (1) and leading into the inner circumferential region (3a) and a second prime fluid passage section (61) passing through the second joint body (2) and leading into the inner circumferential region (3a). A slurry fluid (106), such as a polishing solution, flows through the prime fluid passage (6) without leaking out of the relatively rotating section of the joint bodies (1, 2).

23 Claims, 10 Drawing Sheets

ROTARY JOINT

BACKGROUND OF THE INVENTION

1. Field of the Invention

The present invention relates to rotary joints for fluids, and more specifically to rotary joints that allow fluids—such as polishing solution for polishing the surface of silicon wafer by the chemical mechanical polishing (CMP) technique—to flow through the components that rotate relative to one another.

2. Description of the Prior Art

An apparatus for polishing the surface of silicon wafers by CMP, to which this invention relates, has been developed in recent years. The apparatus, as shown in FIGS. 10 and 11, comprises: a rotary table 102 that rotates horizontally; a pad shaft support block 103 which moves horizontally back and forward and up and down; a polishing pad shaft 104 which, held by the pad shaft support block 103, is forced to rotate; a slurry fluid feeding and discharging passage 105 formed on the non-rotary side in the pad shaft support block 103; a feeding and discharging mechanism 107 connected to the slurry fluid feeding and discharging passage 105 for a polishing solution 106, for example, a KOH-contained silica slurry mixed in isopropyl alcohol; a slurry fluid feeding and discharging passage 108 on the rotary side which runs through the polishing pad shaft 104 and opens at the central portion of a pad head 104a; and a rotary joint 101 which, installed between the pad shaft support block 103 and the polishing pad shaft 104, connects the two slurry fluid feeding and discharging passages 105 and 108 in such a way that the two passages 105 and 108 are relatively rotatable when communicating with each other.

By that surface polishing apparatus, the silicon wafer 109 is polished in this way: first, the silicon wafer 109 is held on the rotary table 102, the surface 109a up, and the polishing pad shaft 104 is moved down until the pad head 104a comes into contact with the wafer surface 109a. Then, the polishing solution 106 is jetted out to between the pad head 104a and the wafer 109 by means of positive pressure action (jetting operation of the polishing solution pump) of the feeding and discharging mechanism 107. And the polishing pad shaft 104 is rotated and moved back and forward horizontally to polish the wafer surface 109a. After polishing is over, the feeding and discharging mechanism 107 is switched to negative pressure action (sucking operation of the polishing solution pump) to suck and remove the residues of the polishing solution 106 in the slurry fluid feeding and discharging passages 105 and 108. That is, care is taken so that the residues of the polishing solution 106 in the slurry fluid feeding and discharging passages 105 and 108 may not drop on the polished surface of the wafer, and that is effected by switching the slurry fluid feeding and discharging passages 105, 108 from the positive pressure mode to the negative pressure or dry mode.

The rotary joint 101 mounted in that surface polishing apparatus is designed as in the following. A first joint body, which is to be mounted on the pad shaft support block 103, is connected to a second joint body, which is to be fixed on the polishing pad shaft 104 such that the firs joint body and the second joint body may rotate relative to one another. Within the first joint body is formed a first fluid passage section which is connected to the slurry fluid feeding and discharging passage 105 on the non-rotary side. In the second joint body on the rotary side is formed a second fluid passage section that is connected to the slurry fluid feeding and discharging passage 108. A space formed between the two slurry fluid passage sections is sealed with a sealing member placed between the relatively rotating opposed faces of the first joint body and the second joint body. An example of such a sealing member is sealing faces formed on the opposing parts of the relatively rotating first and second joint bodies that are brought into contact with and pressed against each other. Another example to seal the relatively rotating parts is elastic seal materials such as O-ring.

The rotary joint 101 of such a design presents the following problems. That is, the polishing solution 106 is a slurry fluid containing abrasive grains. Those abrasive grains tend to intrude and be deposited between the sealing faces, making it difficult to keep the sealing function in a good shape for a long period. Also, the sealing faces will be worn in contact with the polishing solution 106, losing sealing function in a short period. Another problem is that wear particles from the seal faces and ingredients dissolving out of the elastic seal will get mixed in polishing solution 106, hampering the polishing of wafer surface 109a. The intrusion and deposition of such abrasive grains and the wearing of the sealing faces occur more evidently in particular by switching the slurry fluid feeding and discharging passages 105, 108 from positive pressure to negative pressure or dry mode. Especially in the dry mode, in addition, seizure will be inflicted on the sealing faces because of frictional heat. If the intrusion and deposition of abrasive grains and the wearing of the sealing faces affect the seal performance, polishing solution 106 can leak out of the sealing faces, causing such problems as staining wafer surface 109a and creeping into the bearings between the first and second joint bodies and hindering the polishing pad shaft 104 from rotating smoothly. And good polishing could hardly be hoped for of such a rotary joint 101.

Those problems are encountered with the prior art rotary joint 101 not only in the aforesaid surface polishing apparatus but in a rotary equipment in which a slurry fluid like polishing solution or a corrosive fluid must flow between component parts rotating at a rate higher than a certain level. Such being the case, it has been keenly desired that a solution to the problems should be found, but the fact is that no rotary joint for fluids has been developed which exhibits a stabilized sealing performance for a long time.

SUMMARY OF THE INVENTION

Accordingly, it is an object of the present invention to provide a rotary joint which permits smooth flow of a flurry fluid such as a polishing solution or a corrosive fluid through relatively rotating component parts without leakage and which makes a surface polishing apparatus or other equipment properly perform the functions as mentioned earlier.

It is another object of the present invention to provide a rotary joint that always exhibits a good and stable sealing performance irrespective of the sealing conditions such as the pressure and properties of fluid, thus perfectly preventing the contamination of fluids and the environment and which is suitable for use in a variety of equipment where a high degree of cleanness is required.

It is still another object of the present invention to provide a rotary joint which permits simultaneously smooth flow between the two joint bodies of a slurry fluid like polishing fluid and one or more kinds of liquids or gases, thus opening up a wide range of applications.

It is yet another object of the present invention to provide a rotary joint that can be reduced in size to a maximum extent.

Those objects are attained by a rotary joint constructed according to the present invention.

The rotary joint of the present invention comprises: a first joint body; a second joint body connected to the first joint body such that the second joint body is allowed to rotate in relation the first joint body; and a prime seal unit installed between opposed end portions of the two joint bodies, the opposed end portions arranged in the direction of the axis of rotation; and a continuous line of prime fluid passage which runs through the two joint bodies. The prime seal unit is a mechanical seal comprising: a stationary seal ring fixed concentrically on one of the opposed end portions of the two joint bodies with the axis of rotation as its center; a movable seal ring held on the other of the opposed end portions, concentric with the stationary seal ring and movable in the axial direction; a rotation stopper provided in the outer circumferential portion of the movable seal ring for preventing the movable seal ring from relative rotation while allowing the movable seal ring to move in the axial direction; and a thrusting mechanism that urges the movable seal ring against the stationary seal ring. And the seal unit is so built as to work as a seal between the outer and inner circumferential regions by the sliding contact between the relatively rotating two ring seals. The prime fluid passage is formed out of the inner circumferential or inside region of the two seal rings, a first prime fluid passage section which passes through the first joint body and opens at the inside region, and a second prime fluid passage section which passes through the second joint body and opens into the inside region.

In a preferred embodiment, one of the two opposed end faces of the two seal rings in the aforesaid seal unit is tapered or sharpened. In other words, one of the opposed seal end faces of the seal rings is in a circular form with a small width in the radial direction. The width in the radial direction of the circular face is set at preferably 0.1 to 0.8 mm, more preferably 0.4 to 0.7 mm. It is also desirable that the inner and outer circumferential faces forming the tapered or sharpened seal are conical in sectional shape and are at an identical angle of 105 to 150° C. relative to the seal end face.

It is also desired that the prime seal unit is formed as a mechanical seal with $0 \leq K \leq 0.6$ wherein K is the balance ratio.

The seal rings in the prime seal unit are made of silicon carbide, aluminum oxide, fluororesin or PEEK (polyether ether ketone). It desirable that at least the seal end faces of the seal rings should be made of silicon carbide. Preferred grades of silicon carbide for the purpose are not higher than 200 ppm in total metal content.

It is desirable that the stationary seal ring is made in a cylindrical form and fitted over the end of the joint body or fitted into a recess formed in the end portion of the joint body.

In case it is required that the prime fluids flowing in the main fluid passage not be contaminated with metals in the rotary joint, it is desired that the parts of the prime fluid passage which come into contact with the fluids should be made of a material that does not release metal components when coming into contact therewith.

The material that does not release metal components when into contact with the fluid means a material that does not give off metal ions when coming into contact with the fluid flowing through the prime fluid passage or which, in case the fluid contains solid ingredients such as abrasive grains, does not produce metal particles when coming into contact with the solid ingredients. Among such materials are generally plastics and silicon carbide. The ways of forming with such a material the parts of the fluid passage coming into contact with the fluid include the following two examples: one in which only the parts coming in direct contact with the fluid is made of those materials as by coating; and the other case where the component parts of the two joint bodies in which fluid passages are formed, or all the component parts of the two joint bodies and the seal rings, are made of those materials. It is desired that at least the inside walls of the respective prime fluid passage sections (including the component parts of the two joint bodies or the whole of the two joint bodies) are made of a plastic material inert in or resistant to the flowing fluid, for example. The inert or resistant plastic material is selected on the basis of the properties of the fluid. If, for example, the fluid contains solid ingredients such as abrasive grains, a plastic material to be selected should be free from wearing and releasing particles when coming into contact with the solid ingredients. If the fluid is hot in temperature, the plastic material to be selected should be thermo-resistant. If the fluid is corrosive, the plastic material to be selected should be resistant to corrosion. Concrete examples are engineering plastics such as PEEK, PES (polyethersulfone), and PC (polycarbonate) which are free from wearing and releasing particles when coming into contact with the solid ingredients such as abrasive grains and excellent in work dimensional stability and heat resistance and corrosion-resistant plastics such as PTFE (polytetrafluoroethylene plastic), PFA (tetrafluoroethylene perfluoroalkoxy vinyl ether copolymer), and FEP (fluorinated ethylene propylene copolymer plastics).

In a preferred embodiment, there is provided a cooling water space where the cooling water is supplied and circulated to cool the contact area of the two seal rings. This space is a region on the outer circumferential side of the two seal rings, formed between the outer circumferential surface of the second joint body and the inner circumferential surface of the first joint body and sealed with a seal unit provided on the circumferential surfaces and the prime seal unit. In this arrangement, it is desirable that the first joint body is provided with an inlet port and an outlet port which open into the cooling water space so that the cooling water may be circulated.

Furthermore, in case a fluid has to flow through a passage other than the prime fluid passage, a continuous line of auxiliary fluid passage is formed from two auxiliary fluid passage sections and a connecting region. The connecting region is a space between the outer circumferential surface of the second joint body and the inner circumferential surface of the first joint body which concentrically encircles the second joint body, and is sealed with a couple of circumferential side seal units placed therebetween and arranged in the direction of axis of rotation. The first and second auxiliary fluid passage sections open at the connecting region and are formed in such a way as not to cross the prime fluid passage sections.

A preferred circumferential seal unit is a mechanical seal comprising a stationary seal ring that is fixed to the inner circumferential surface of the first joint body and a rotary seal ring which is held on the outer circumferential surface of the second joint body—concentrically with, and opposite to the stationary seal ring, movable in the axial direction and urged against the stationary seal ring.

In such an arrangement, it is desirable that the inner circumferential surface of the stationary seal ring in at least one of the circumferential side seal units serves as a ring-formed bearing fitted over the outer circumferential surface of the second joint body, while allowing the second joint body to remain rotatable. In the circumferential seal units, a plate spring elastically changeable in form in the axial direction is preferred as thrusting mechanism to urge the rotary seal ring against the stationary seal ring. The seal rings in the circumferential side seal unit is made of silicon carbide, aluminum oxide, fluororesin, PEEK, or carbon. It is desired that one of the two seal rings in the circumferential side seal unit is made of silicon carbide and the other made of carbon.

In the respective joint bodies, it is also desired that at least the inside wall of the auxiliary fluid passage sections is made of a plastic material inert in or resistant to the fluid that flows through the auxiliary fluid passage sections. Depending on the properties of the flowing fluid, a plastic material is selected from among such engineering plastics as PEEK, PES, and PC, and corrosion-resistant plastics such as PTFE, PFA, and FEP.

The contact areas between the seal rings in the prime seal unit and in the circumferential side seal unit and the joint bodies are secondarily sealed by an O-ring. A preferred O-ring is made of fluororubber or fluororesin.

DESCRIPTION OF THE PREFERRED EMBODIMENTS

FIGS. 1 to 9 show preferred embodiments of the rotary joint of the present invention. It is to be understood that the terms "upper" or "above" and "lower" or "below" are used for convenience' sake in describing the present invention and applicable on those drawings only.

Embodiment 1

Figure 1:
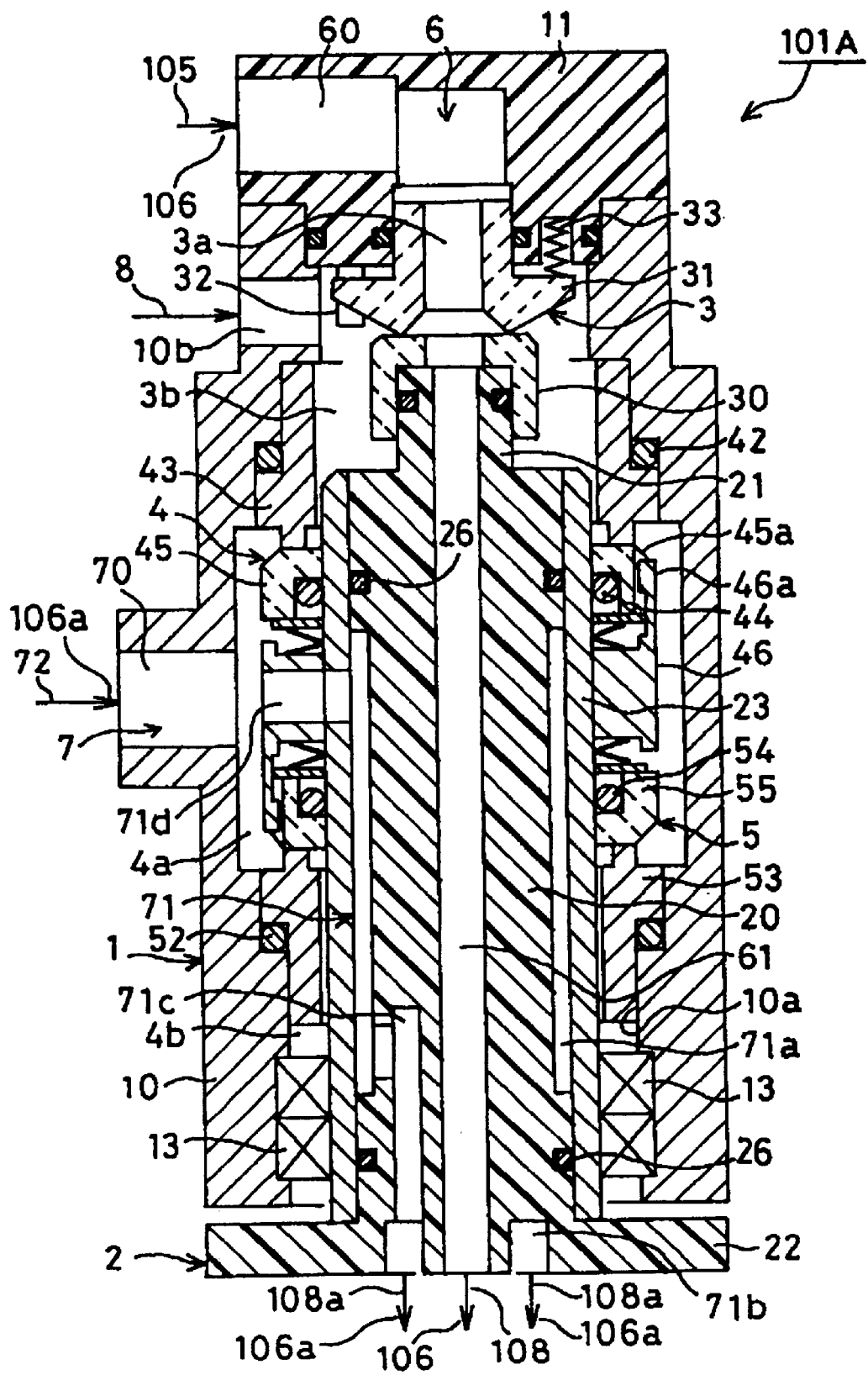
FIG. 1 is a vertical, sectional view of an example of the rotary joint embodying the present invention.
Figure 2:
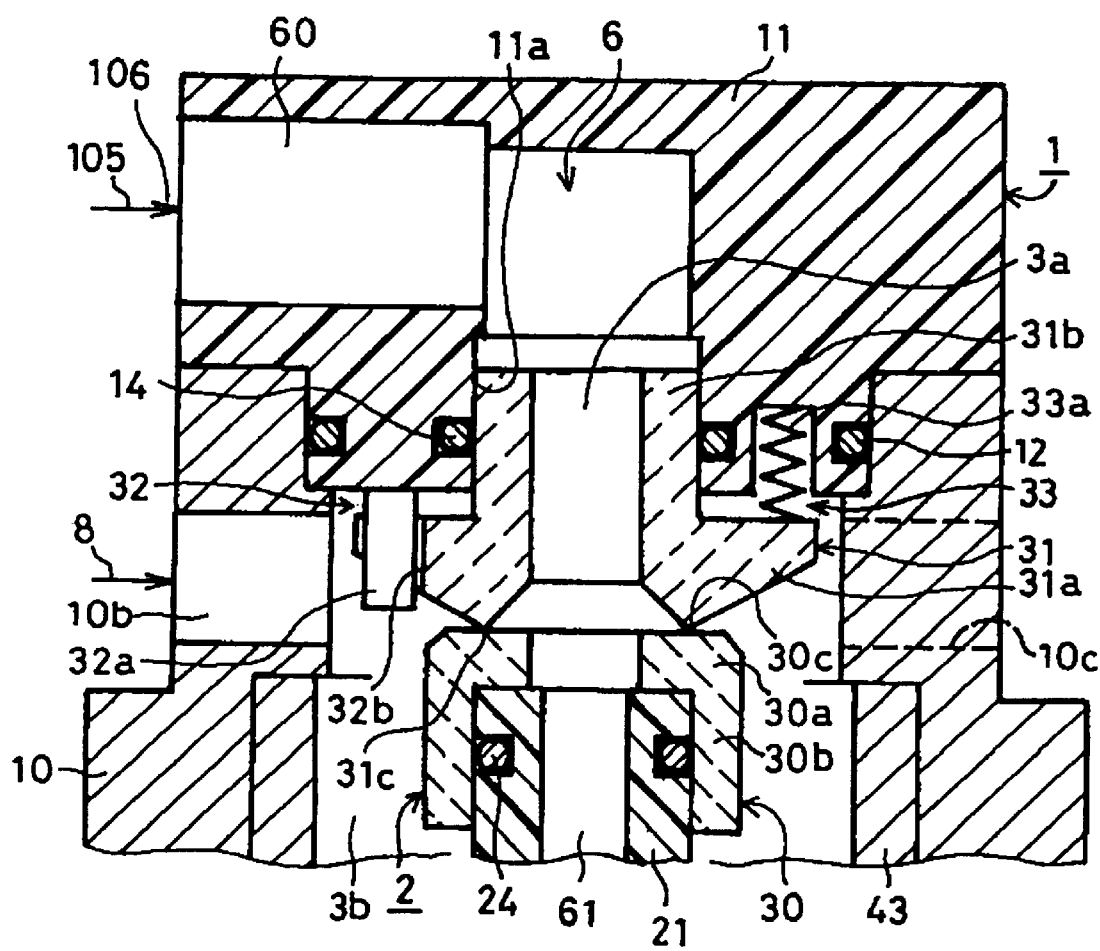
FIG. 2 is an enlarged view of a core portion of FIG. 1.
Figure 3:
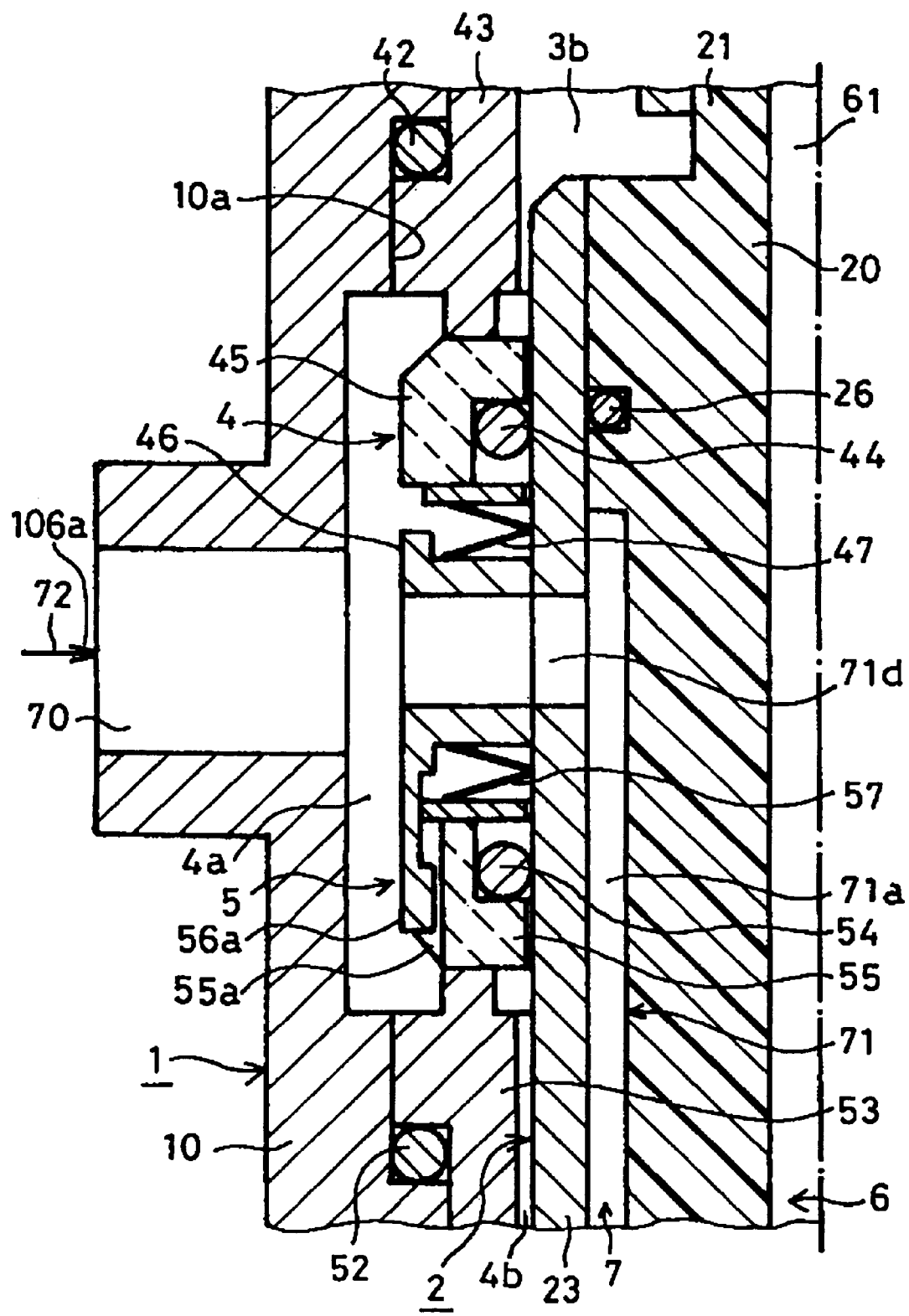
FIG. 3 is an enlarged view of another core portion of FIG. 1.

FIGS. 1 to 3 show a first embodiment of the present invention.

Figure 10:
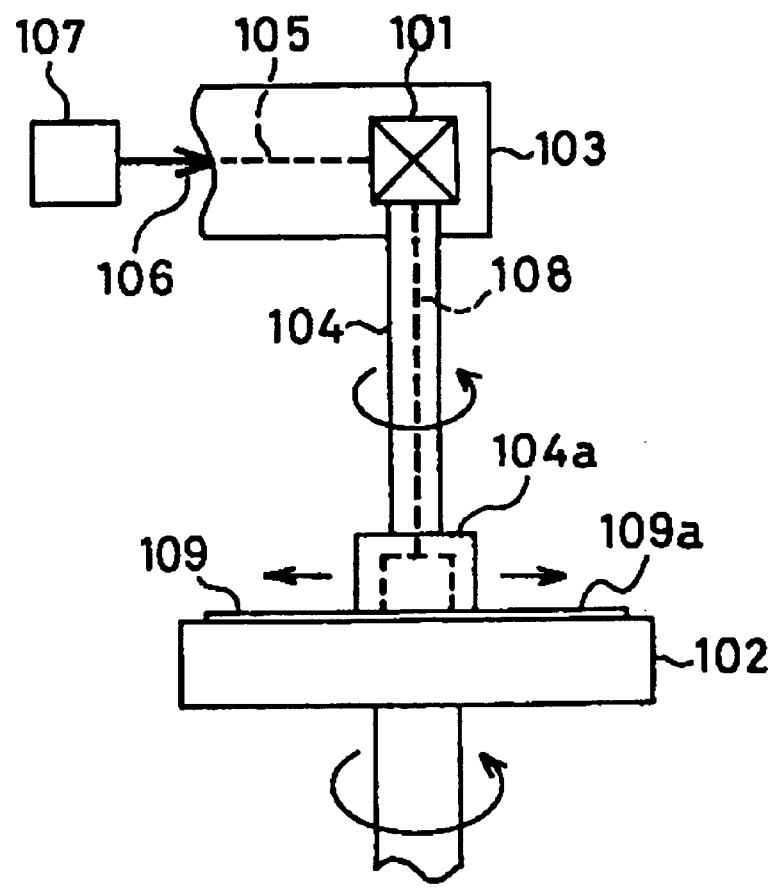
FIG. 10 is a schematic side view of a surface polishing apparatus equipped with a rotary joint.

This embodiment concerns an example in which the present invention is applied to the rotary joint 101 to be mounted on the surface polishing apparatus as described earlier. As shown in FIG. 10, the rotary joint 101 is placed between the pad shaft support block 103 and the polishing pad shaft 104 so that the slurry fluid feeding and discharging passage 105 on the non-rotary side may communicate with the slurry fluid feeding and discharging passage 108 on the rotary side.

The rotary joint of the present invention in this embodiment—the first rotary joint 101A—, as shown in FIG. 1, comprises: a first joint body 1 to be fixed to the pad shaft support block 103; a second joint body 2 to be fixed to the polishing pad shaft 104; a prime seal unit 3 and a plurality of circumferential side seal units 4, 5 to be placed between the two joints 1, 2; and a continuous line of prime fluid passage or slurry fluid passage 6; and an auxiliary fluid passage or non-slurry fluid passage 7.

The first joint body 1, as shown in FIG. 1, comprises a cylindrical side wall 10 having an inner circumferential surface 10a and an end wall 11 fixed on the top of the side wall 10 to block the top. The side wall 10 is made of a metal material such as stainless steel (in this example, the grade of steel having the JIS designation "SUS 304." The end wall 11 is made of engineering plastics such as PEEK, PES, and PC which are free from wearing and releasing particles when coming into contact with abrasive grains and excellent in work dimensional stability and heat resistance, because a first slurry fluid passage section 60 where polishing solution 106 flows is formed in the end wall 11, as will be described later. In this example, PEEK is used.

The second joint body 2 is formed, as shown in FIG. 1, of a cylindrical main part 20, a seal ring retainer 21 formed at the top of the main part 20, a disk-like flange portion 22 formed at the bottom of the main part 20, and a cylindrical sleeve 23 fitted over the main part 20. The parts of the second joint body 2 except for the sleeve 23—the main part 20, the seal ring retainer 21, and the flange portion 22—are integrally formed. Those parts 20, 21, and 22 have a second slurry fluid passage section 61 for polishing solution formed therein, as will be described later. Hence, as the first slurry fluid passage section 60, those parts are made of engineering plastics that are wear resistant to abrasive grains and excellent in work dimensional stability and heat resistance, such as PEEK, PES, and PC. In the present example, PEEK is used. Seal ring retainer 21 is concentric with main part 20 and circular in section with a smaller diameter than that of the main part. Like side wall 10, sleeve 23 is made of a metal material such as stainless steel. In the present embodiment, the grade of stainless steel having the JIS designation "SUS 304" is used.

Second joint body 2 is supported by the first joint body and is rotatable, with a bearing 13 placed between side wall 10 and sleeve 23 at the lower ends thereof and with the parts of the second joint body except for the flange portion 22—the main part 20, the seal ring retainer 21, and the sleeve 23—inserted into the first joint body 1. The second joint body 2, the flange portion 22 of which is mounted on the polishing pad shaft 104, is forced to turn with the polishing pad shaft 104, as is evident from FIGS. 1 and 10.

The prime seal unit 3 is made up, as shown in FIGS. 1 and 2, of a stationary seal ring 30 provided on the second joint body 2, a movable seal ring 31 provided on the first joint body 1, a rotation stopper 32 and a thrusting mechanism 33 provided between the movable seal ring 31 and the first joint body 1.

The stationary seal ring 30 is made up, as shown in FIG. 2, of a ring-formed main part 30a and a cylindrical fixing part 30b provided thereunder and integrally formed with the main part 30a. Made of silicon carbide, the ring 30 is fixed concentrically to the second joint body 2 with the fixing part 30b fitted over the seal ring retainer 21. The upper end face of the main part 30a is a smooth seal end face 30c perpendicular to the axial direction of the second joint body 2. The fitting area between the stationary part 30b and the seal ring retainer 21 is provided, for secondary sealing, with an O-ring 24 held in the outer circumferential portion of the seal ring retainer 21. The O-ring 24 is made of fluororesin or fluororubber, for example, "Viton" or Kalrez" (Du Pont).

The movable seal ring 31, made of silicon carbide, includes a ring-formed main part 31a and a cylindrical retainer 31b provided at the upper end thereof and integrally formed therewith, as shown in FIG. 2. The ring 31 is held in the first joint body 1 concentrically with the stationary seal ring 30, and is movable in the axial direction, with the retainer 31b fitted into a retention hole 11a formed in the end wall 11. The fitting area between the retainer 31b and the retention hole 11a is provided, for secondary sealing, with an O-ring 14 held in the inner circumferential portion of the retention hole 11a. The O-ring is made of fluororesin or fluororubber such as, for example, "Viton" or "Kalrez" (Du Pont). The outside diameter of the main part 31a is designed to be larger than that of the retainer 31b by a certain size. The lower end portion of the movable seal ring 31 is pointed in vertical cross section, with the outer circumferential surface of the main part 31a tapering or diminishing in diameter toward the lower end while the inner circumferential surface expanding. The lower end face of the pointed lower end portion of the movable seal ring 31 is an annular seal end face 31c which is concentric with and comes in linear contact with the seal end face 30c. The outside diameter of the seal end face 31c is roughly equal to that of the retainer 31b.

The rotation stopper mechanism 32 keeps the movable seal ring 31 from rotating in relation to the first joint body 1 while allowing the ring 31 to move in the axial direction. This mechanism 32 is provided, as shown in FIG. 2, in the lower end portion of the end wall 11 of the first joint body 1. One or a plurality of rotation stoppers 32a are embedded in the axial direction in the outer circumferential portion of the retention hole 11a. In the outer circumferential portion of the main part 31a of the movable seal ring 31 is formed one or more engaging holes 32b with which the stopper pins 32a engage.

The thrusting mechanism 33 comprises, as illustrated in FIG. 2, a plurality of springs 33a placed between the upper end of the main part 31a of the movable seal ring 31 and the opposing lower end of the end wall 11 of the first joint body 1, thrusting the movable seal ring 31 toward the stationary seal ring 30 so that the two seal end faces 30c, 31c may be urged against and come into contact with each other.

The prime seal unit 3 works the same way as mechanical seals of the end-face contact type. In other words, with the second joint body 2 rotating, the rotational sliding contact provides sealing between the seal end faces 30c, 31c, that is, between the region 3a on the inner circumferential side of the two seal rings 30, 31 (the first connecting region) and the region 3b on the outer circumferential side of the same. In this connection referring to FIGS. 2, 6 and 10, it is to be noted, it is desired that factors such as the dimensions of the respective components including the diameter of the pointed seal end face 31c are set so as to ensure and maintain a good sealing performance of the seal end faces 30c, 31c regardless of inversion of the pressure relationship between regions 3a and 3b occurring when the polishing solution feeding and discharging mechanism 107 is under a negative pressure mode (as the slurry fluid passage 6 is switched to the dry mode). Those factors are preferably set, for instance, so as to bring the balance ratio to zero, which will be described later.

In addition, a plurality of circumferential side seal units are provided between the sleeve 23 or the outer circumferential portion of the second joint body 2 and the inner circumferential portion of the first joint body 1, i.e. inner circumferential surface 10a of the side wall 10 which concentrically surrounds the sleeve 23. In the present example, first and second circumferential side seal units 4, 5 are installed between the sleeve 23 and the inner circumferential surface 10a of the side wall 10 and arranged in the direction of rotation axis (vertical direction) of the second joint body, as shown in FIG. 1.

The first circumferential side seal unit 4 is a mechanical seal of the end-face contact type placed between the side wall 10 and the sleeve 23 as shown in FIGS. 1 and 3, which seals the lower end of the region 3b at the outer circumference the seal rings 30, 31. And the region 3b serves as cooling water space 3b. To further illustrate, the first circumferential side seal unit 4 is formed, as illustrated in FIG. 3, of: a carbon stationary seal ring 43 fitted and held in the inner circumferential surface 10a of the side wall 10 with an O-ring 42 placed therebetween; a rotary seal ring 45 of silicon carbide held below the stationary seal ring 43 and around the sleeve 23 movable in the axial direction with an O-ring 44 placed between the ring 45 and the sleeve 23; a spring retainer 46 fixed to the sleeve 23 below the rotary seal ring 45; and a spring 47 put between the rotary seal ring 45 and the spring retainer 46 to push the rotary seal ring 45 toward the stationary seal ring 43. And the relative rotation of and sliding contact between the two seal rings 43 and 45 produces a seal between the outer circumferential region 4a and the inner circumferential region, that is, the cooling water space 3b. The rotary seal ring 45 is held in the second joint body 2 and movable in the axial direction but not relatively rotatable with an engaging protrusion 46a engaging with an engaging groove 45a as illustrated in FIG. 1. The protrusion 46a is formed on the spring retainer 46 while the engaging groove 45a is provided in the outer circumferential portion of the rotary seal ring 45. The spring 47 used in this example is a dish-like plate spring as shown in FIG. 3.

Thus, the cooling water 8 is fed into the cooling water space 3b through an inlet port 10b provided in the side wall 10 of the first joint body 1 as shown in FIGS. 1 and 2. It is designed that this cooling water 8 cools the seal rings 30, 31 of the prime seal unit 3. The cooling water used there is generally clean water at room temperature. The side wall 10 has an outlet port 10c formed in the side wall 10 which opens into the cooling water space 3b so that the cooling water 8 may circulate within the cooling water space 3b.

The second circumferential side seal unit 5 is also a mechanical seal of the end-face contact type provided below the first circumferential seal unit 4 and between the side wall 10 and the sleeve 23. The second unit 5 is of the same construction as, but axial symmetrical to, the first unit 4. To further illustrate, the second circumferential side seal unit 5 is formed, as shown in FIG. 3, of the following components: a carbon stationary seal ring 53 fitted and fixed in the inner circumferential surface 10a of the side wall 10 with an O-ring 52 placed therebetween; a rotary seal ring 55 of silicon carbide held above the stationary seal ring 53 and around the sleeve 23 and movable in the axial direction with an O-ring 54 placed therebetween; the spring retainer 46 clamped on the sleeve 23 above the rotary seal ring 55; and a spring 57 put between the rotary seal ring 55 and the spring retainer 46 to push the rotary seal ring 55 toward the stationary seal ring 53. And the relative rotation of and sliding contact action between the two seal rings 53 and 55 produces a seal between the outer circumferential region 4a and the inner circumferential side atmospheric region 4b on the bearing side. The spring retainer 46 is shared with the first circumferential seal unit 4. Just as with the rotary seal ring 45 in the first circumferential side seal unit 4, the rotary seal ring 55 is held in the second joint body 2 and is movable in the axial direction but not relatively rotatable with an engaging protrusion 56a engaging with an engaging groove 55a. The protrusion 56a is formed in the spring retainer 46, while the groove 55a is provided in the outer circumferential portion of the rotary seal ring 55. The outer circumferential region 4a is a connecting region 4a—referred to hereinafter as a second connecting region—with the loop-formed region between the outer and inner circumferential surfaces 10a, 23 closed at the upper and lower ends by the first and second circumferential side seal units 4, 5. The O-rings 42, 44, 52 and 54 are all made of fluororubber or fluororesin like the O-rings 14, 24.

The slurry fluid passage 6 is a continuous one formed out of the first prime fluid passage section or the first slurry fluid passage section 60 formed in the first joint body 1 and the second prime fluid passage section or the second slurry fluid passage section 61 formed in the first joint body 2, the two sections 60, 61 communicating with each other via the first connecting region 3a which is sealed by the prime seal unit 3. The passage 6 is to be connected to the slurry fluid feeding and discharging passages 105, 108. The first slurry fluid passage section 60 is formed in the end wall 11 of the first joint body. One end of the first slurry fluid passage section 60 leads into the first connecting region 3a and the other end opens in the outer circumferential surface of the end wall 11. To this opening is connected the slurry fluid feeding and discharging passage 105 on the non-rotary side of the pad shaft support block 103 on which the first joint body 1 is mounted. The second slurry fluid passage section 61 passes through the main part 20 of the second joint body 2, seal ring retainer 21 and flange portion 22 along the axis of rotation of the second joint body 2. One end of the second slurry fluid passage section 61 leads into the first connecting region 3a with the other end opening at the lower end part of the flange portion 22. This opening is to be connected to the slurry fluid feeding and discharging passage 108 on the rotary side or the polishing pad shaft 104 on which the second joint body 2 is mounted.

Figure 11:
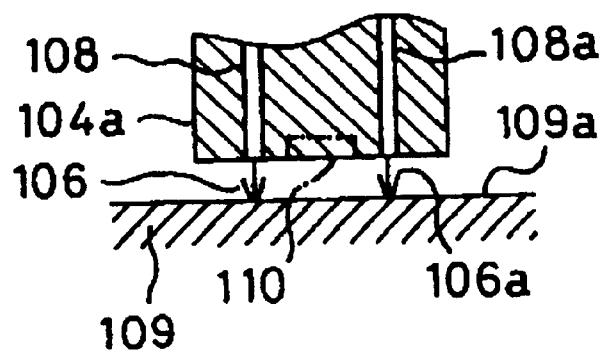
FIG. 11 is an enlarged view of a core portion of FIG. 10.

To get the surface polishing work done better with the surface polishing apparatus, it is desirable that a pad head 104a is provided with a plurality of air blasting ports 108a around the opening of the slurry fluid feeding and discharging passage 108 on the rotary side, as shown in FIG. 11. Compressed air is blasted out through those air blasting ports 108a, so as to help disperse polishing solution 106 uniformly as the solution 106 is jetted out to between the pad head 104a and silicon wafer 109, and also to remove the polishing residue from between the two parts 104a, 109 as swiftly as possible.

The auxiliary fluid passage, that is, the non-slurry fluid passage 7 is formed to supply compressed air 106a to those air blasting ports 108a. As illustrated in FIGS. 1 and 3, the passage 7 is a continuous passage formed from a first auxiliary fluid passage section or a first non-slurry fluid passage section 70 formed in the first joint body 1 and a second auxiliary fluid passage section or a second non-slurry fluid passage section 71 formed in the second joint body 2, the two sections communicating with each other through the second connecting region 4a which is closed by the first and second circumferential seal units 4, 5. The first non-slurry fluid passage section 70 which leads into the second connecting region 4a passes through the side wall 11 of the first joint body 1. To this first non-slurry fluid passage section 70 is connected an air feeder 72 led to a suitable compressed air feeding source (not shown) through which the non-slurry fluid, that is, compressed air 106a is supplied. The secondary non-slurry fluid passage section 71 includes a circular path 71a formed by closing a tubular space around the outer circumferential surface of the main part 20 with the sleeve 23, a circular path 71b or a ring-formed space surrounding the second slurry passage section 61 and opening at the lower end of the flange portion 22, a path 71c formed in the main part 20 to connect the two circular paths 71a, 71b, and an inlet path 71d which is formed in the sleeve 23 and the spring retainer 46 for allowing the circular path 71a to communicate with the second connecting region 4a. The circular path 71b or the lower opening portion of the second non-slurry fluid passage section 71 is so designed to communicate with the air blasting ports 108a when the second joint body 2 is attached to the polishing pad shaft 104.

In the surface polishing apparatus as shown in FIG. 10, the rotary joint thus constructed—the first rotary joint 101A—can feed and suck polishing solution 106 without such problems as mentioned earlier and ensure the polishing of the surface of silicon wafer 109 by the surface polishing apparatus with satisfactory results.

That is, in polishing operation with a rotating polishing pad shaft 104, the polishing solution 106 from the feeding and discharging mechanism 107 flows through the slurry fluid feeding and discharging passage 105 on the non-rotary side in the pad shaft support block 103 and the slurry fluid passage 6 in the rotary joint (the first rotary joint 101A) to the slurry fluid feeding and discharging passage 108 of the polishing pad shaft 104 on the rotary side. In the slurry fluid passage 6, the first slurry fluid passage section 60 in the first joint body 1 and the second slurry fluid passage section 61 in the second joint body 2 are forced to rotate in relation to each other as the polishing pad shaft 104 rotates. The polishing solution 106 flows through the slurry fluid passage 6 without leaking from the two passage sections 60, 61, because the first connecting region 3a connecting the two passages 60, 61 is sealed by sliding contact between the stationary seal ring 30 and the movable seal ring 31 which rotate relative to one another.

There could be a concern that the polishing solution 10 may stick to and accumulate at the contact area between the two seal rings 30, 31. But, in fact, any such stuck material would be scraped off by the pointed end of the movable seal ring 31. No solid ingredients or abrasive grains in the polishing solution 106 are allowed to get into and deposit between the two seal end faces 30c, 31c. That is, the two seal end faces 30c, 31c are kept in a good contact condition, leaving no possibility that the seal will fail because of improper contact between the two seal end faces 30c, 31c. Furthermore, the two seal end faces 30c, 31c will not seize up, being cooled by the cooling water 8 supplied to the cooling water space 3b.

It is also noted that the two seal rings 30, 31 are made of a super hard material, silicon carbide, and will not wear and release particles in the course of contact of seal end faces 30c, 31c. That is, there is no concern that wear particles will get into the polishing solution 106, unlike the case with seal rings made of metal or carbon, or a combination of a seal ring made of such a super hard material as silicon carbide and a seal ring formed from such a soft material as carbon, as in conventional mechanical seals of the end-face contact type.

The inner circumferential surface of the slurry fluid passage 6 is formed with a material which will not release particles such as wear particles in contact with the polishing solution 106, especially abrasive grains. That is, the parts in the first joint body where the first slurry fluid passage section 60 is formed (the end wall 11) and the parts in the second joint body where the second slurry fluid passage section 61 is formed (the main part 20, seat ring retainer portion 21 and flange portion 22) are formed with engineering plastics such as PEEK, PES, and PC. Those materials do not wear and release particles in contact with the abrasive grains, and are excellent in work dimensional stability and thermal resistance. In the present example, PEEK is used. The connecting region (first connecting region 3*a*) between the two slurry fluid passage section 60, 61 is surrounded with the inner circumferential surfaces of the seal rings 30, 31 made of silicon carbide which is wear resistant to abrasive grains. That precludes the possibility of wear particles being given off from the passage wall surface while the polishing solution 106 flows through the slurry fluid passage 6.

The rotation stopper mechanism 32 and the thrusting mechanism 33 are indispensable components to ensure satisfactory seal performance by allowing the seal end faces 30*c*, 31*c* to rotate relative to one another under a proper contact pressure. The component parts of stopper pins 32*a* and springs 33*a* are made of a metallic material. If those component parts were in the slurry fluid passage 6, metal particles would come off in contact with the abrasive grains and creep in the polishing solution 106. But the two mechanisms 32, 33 are provided on the outer circumferential side of the movable seal ring 31, and there is nothing in the slurry fluid passage 6 that could contact the abrasive grains or hinder the flow of the polishing solution 106. Therefore, there is no possibility that no metal particles will be released into the flow of the polishing solution in the slurry fluid passage 6.

Thus, polishing solution 106, when passing through slurry fluid passage 6, is well sealed without wear particles getting mixed, and then is jetted out from the slurry fluid feeding and discharging passage 108 on the rotary side to between the pad head 104*a* and the silicon wafer 109 to polish the wafer surface 109*a*.

From pad head 104*a*, compressed air 106*a* is blasted out along with the polishing solution, as indicated in FIG. 11. The air as blasted out helps uniformly disperse the polishing solution 106 between pad head 104*a* and silicon wafer 109 and removes residues to further promote the polishing of the wafer surface 109*a*.

That is, the compressed air 106*a* is fed from the air feeder 72 to the air blasting port 108*a* through the non-slurry fluid passage 7 in the first rotary joint 101A. In the non-slurry fluid passage 7, the first non-slurry fluid passage section 70 in the first joint body 1 and the second non-slurry fluid passage section 71 in the second joint body 2 are forced to rotate in relation to each other as the polishing pad shaft 104 turns. Since the second connecting region 4*a* which connects the two passage sections 70, 71 is sealed by the first and second circumferential side seal units 4, 5, the compressed air 106*a* passes through the non-slurry fluid passage 7 to the air blasting ports 108*a* without leaking from between the non-slurry fluid passage sections 70, 71.

In the non-slurry fluid passage 7, the component parts of the circumferential side seal units 4, 5 including springs 47, 57 exist, unlike in the slurry fluid passage 6. Because the flowing fluid is a non-slurry fluid like air 106*a*, however, there will be no particles generated in contact with the component parts. Also, the non-slurry fluid passage sections 70, 71 have metallic parts formed therein—the side wall 10, spring retainer 46 and sleeve 23—unlike the slurry fluid passage sections 60, 61. But the fluid that flows is not a slurry fluid like the polishing solution 106 but air 106*a*, there are no particles coming off from those parts in contact with the fluid 106*a* (air). The first and second circumferential seal units 4, 5 are formed from a combination of carbon seal rings 43, 53 and silicon carbide seal rings 45, 55 like conventional mechanical seals of the end face contact type. But since the fluid to be sealed by the circumferential side seal units 4, 5 is air 106*a*, there is no need to give such considerations to the configuration and material of the seal rings as in forming the prime seal unit 3. In the first rotary joint 101A, as set forth above, care is taken to ensure smooth flow of the slurry fluid polishing solution 106 and the non-slurry fluid compressed air 106*a* between the relatively rotating bodies by properly selecting the configuration and materials for the constituent sections of the fluid passage 6,7 and the seal rings of the seal units 3, 4, 5, according to the properties of the fluids that flow.

After the polishing operation is ended, the pressure inside the slurry fluid passage 7 is switched from the positive pressure mode to the negative pressure mode (dry mode). Under the negative pressure, too, the seal rings 30, 31 of the prime seal unit 3 are cooled by the cooling water 8 and there is no seizure of the seal end faces 30*c*, 31*c*.

Embodiment 2

Figure 4:
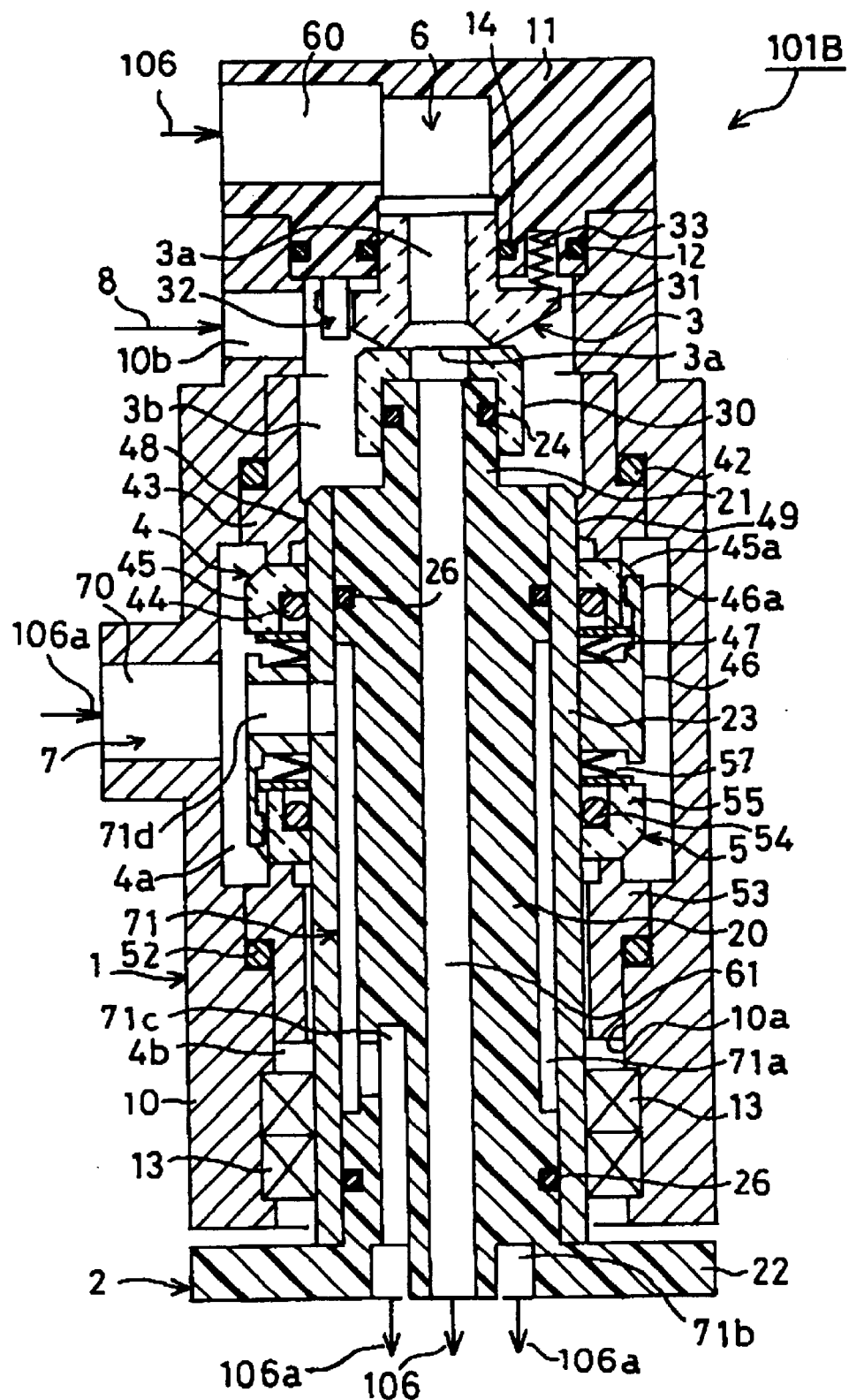
FIG. 4 is a vertical, sectional view of a variation of the rotary joint embodying the present invention.
Figure 5:
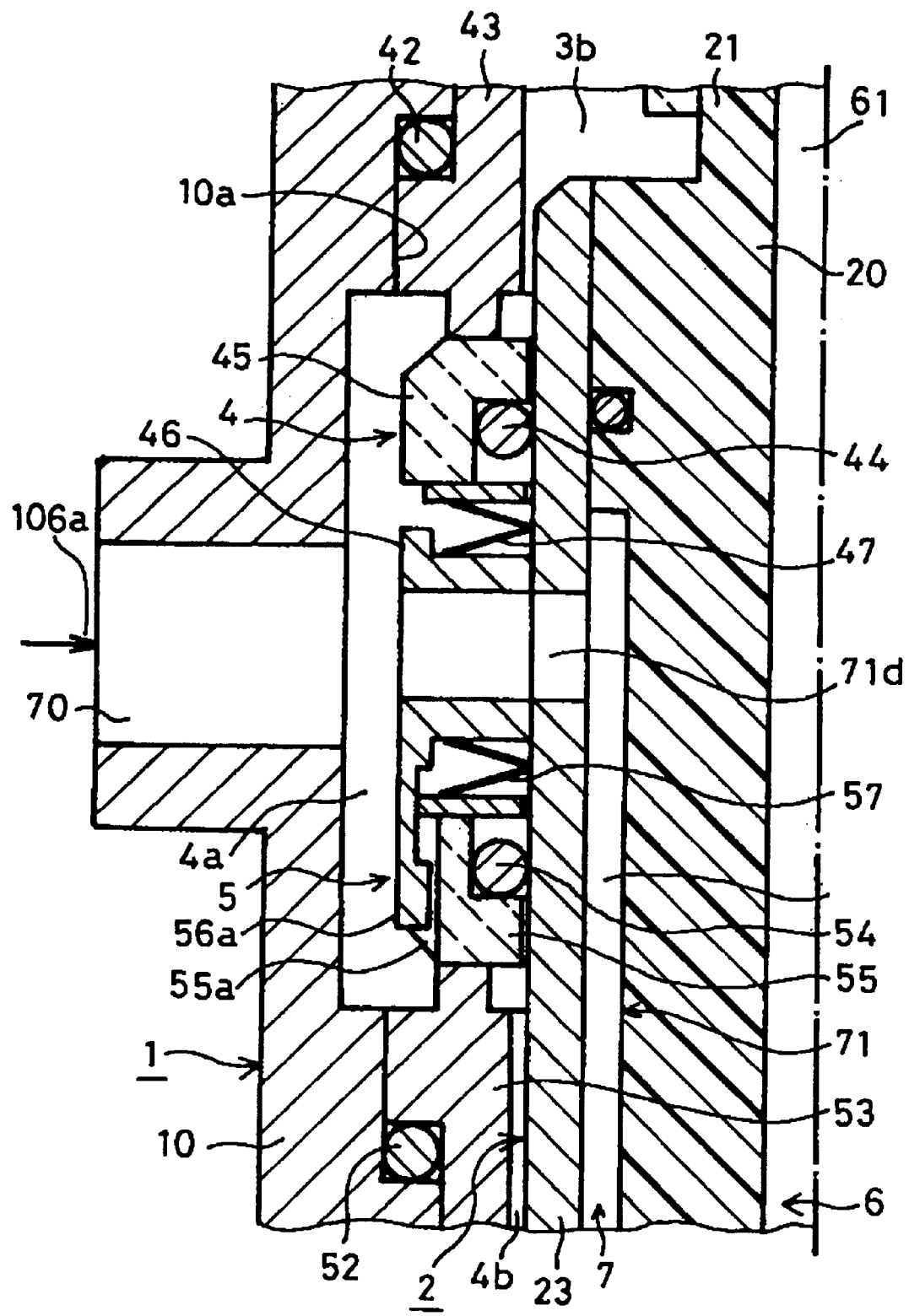
FIG. 5 is an enlarged view of a core portion of FIG. 4.

FIGS. 4 and 5 show a second embodiment of the present invention. In the present embodiment, the present invention is applied to a rotary joint with two relatively rotating bodies 1, 2 through which are passed the prime fluid 106, such as pure water, for treatment of semiconductor wafer and the auxiliary fluid 106*a*, like compressed air, to be blasted out from the polishing pad shaft 104.

That is, the rotary joint in the present embodiment of the invention—the second rotary joint 101B—as shown in FIG. 4, comprises: a first joint body 1 to be fixed on the stationary component; a second joint body 2 to be fixed to the rotary component; a prime seal unit 3 and first and second circumferential side seal units 4, 5 placed between the two joint bodies 1, 2; and a prime fluid passage 6 and an auxiliary fluid passage 7. The second rotary joint 101B is of the same construction as the first rotary joint 101A except for some points which will be described. Therefore, the reference numerals designating corresponding parts in FIGS. 4 and 5 are the same as those in FIGS. 1 to 3, and no description will be given of those numerals.

The second rotary joint 101B is so designed that part of the upper first circumferential side seal unit 4 serves as a bearing for the second joint body 2. As shown in FIGS. 4 and 5, the inner circumferential surface of the stationary seal ring 43 serves as a ring-formed bearing face 48 which fits over and holds the upper part of the sleeve 23 of the second joint body 2 such that the sleeve 23 is allowed to relatively rotate. That is, the second joint body 2 is rotatably held in the first joint body 1 by the upper and lower ends by means of a bearing 13 and the bearing face 48 at the lower and upper ends thereof. That ensures more smooth rotation of the joint without axial vibration as compared with the joint held by the bearing 13 alone. It is noted that there is provided a very thin, ring-formed gap 49 between the bearing face 48 and the sleeve 23 of the second joint body 2. The idea is that the cooling water 8 enters the gap 49 and forms a lubricating film, which further enhances the bearing function of the face 48. The inside diameter of the bearing face 48 is selected to be roughly identical with the outside diameter of the sleeve 23 on condition that the bearing face 48 fits over and holds the sleeve 23 such that the sleeve 23 is not displaceable in the radial direction (that is, without axial vibration) but is relatively rotatable. To be specific, it is desirable to select the inside diameter of the bearing face 48 that gives a ring-formed gap some 0.1 mm thick between the bearing face 48 and the sleeve 23.

In the second rotary joint 101B, it is also noted, the area in contact with the fluid of the prime fluid passage 6 is formed from a material which will not give off metallic components on contact with the prime fluid 106 such as pure water. In other words, of the component parts of the first joint body 1 and the second joint body 2, the following parts are made of engineering plastics such as PEEK, PES, and PC which are free from wearing when coming into contact with abrasive grains and excellent in work dimensional stability and heat resistance. Those parts are the end wall 11 in the first joint body 1 where the first fluid passage section 60 is formed and the main part 20 in the second joint body 2 where the second fluid passage section 61 passes, including the seal ring retainer portion 21 and flange portion 22 which are integrally formed therewith. The seal rings 30, 31 are all made of silicon carbide. No such consideration needs to be given to other component parts of the rotary joint, which do not come into contact with the prime fluid 106—that is, those parts other than the aforesaid parts 11, 20, 30, and 31. These other component parts includes parts 10, 13, 14, 23, 24, 32a, 33a, 42, 44, 45, 46, 47, 52, 53, 54, and 57. There is no need to take into consideration releasing of metallic components in designing those parts, and what material to use is decided on according to the service conditions of the rotary joint. For example, the side wall 10 in the first joint body 1 and the sleeve 23 in the second joint body 2 are made of a metal material such as the stainless steel grade under the JIS designation "SUS 304" while the stationary seal rings 43, 53 are made from carbon and the rotary seal rings 45, 55 are made of silicon carbide. The O-rings are made of Viton, and the stopper pins 32a and the thrusting mechanisms 33, 47, 57 are made of a metal material such as the stainless steel having the JIS designation "SUS 316."

Like the first rotary joint 101A, the second rotary joint 101B allows the prime fluid 106 to flow through the prime fluid passage 6 without leaking through the connecting region between the prime fluid passage sections 60, 61 which is sealed by the sliding contact between the stationary seal ring 30 and the movable seal ring 31 which rotate relative to one another. Then, since the movable seal ring 31 is pushed toward the stationary seal ring 30 by the thrusting mechanism 33, the two seal end faces 30c, 31c are kept in a proper contact even if the relative position relationship changes because of vibration or the like. In addition, because the second joint body 2 is supported by the bearing face 48 of the stationary seal ring 43 and the bearing 13 both at the upper and lower ends, the axial vibration of the second joint body 2 is effectively prevented. Therefore, there is no concern that the two seal end faces 30c, 31c will change in relative positional relationship in the radial direction. That is, the two seal end faces 30c, 31c are kept in a proper contact, with a good seal performance exhibited.

It is also noted that the end wall 11 of the first joint body 1 and the main part 20 of the second joint body 2 in which the prime fluid passage 6 is formed are made of an engineering plastic material such as PEEK and the seal rings 30, 31 are made of silicon carbide. That is, those materials do not release metal ions and the like in contact with the prime fluid 106 at the fluid contact area in the prime fluid passage 6, and no metal components get into the prime fluid 106.

It might be feared that if the main part 20 of the second joint body 2 is made of a plastic material such PEEK, the main part 20 would expand because of frictional heat generated by the seal rings 30, 31, thereby preventing the seal end faces 30c, 31c from coming in proper contact on account of high contact pressure. That would be especially the case with the seal construction where the seal end faces 30c, 31c come into linear contact. But the metallic sleeve 23 is fitted over the main part 20. Hence, even if the main part 20 is made of a plastic material with a low thermal conductivity, the thermal expansion of the main part 20 is greatly reduced because of heat radiation by the sleeve 23 made of a metallic material with a high heat conductivity. Furthermore, the present example is so designed that the sleeve 23 comes into contact with the cooling water 8 and the auxiliary fluid 106a such as compressed air. And those fluids 8, 106a can be expected to have cooling effect. Those heat radiation and cooling effects keep the main part 20 from undergo thermal expansion, and there is no such fear as mentioned above. Further, provision of the metal sleeve 23 helps to secure a sufficient degree of mechanical strength for the second joint body 2 as a whole even if the main part 20, which is one of the main components of the second joint body, is made of a plastic material with a low mechanical strength.

It is further noted that the prime fluid passage 6 can be switched from the positive pressure mode to the negative pressure mode or dry mode as necessary. In that dry mode, the seal rings 30, 31 of the prime seal unit 3 is cooled by the cooling water 3. Because of the heat radiation effected by the metal sleeve 23 and the cooling effect through contact with the cooling water 8 and the auxiliary fluid 106a, there is no concern that seal end faces 30c, 31c will seize up.

It is also noted that in the non-slurry passage 7, the first auxiliary fluid passage section 70 in the first joint body 1 and the second auxiliary fluid passage section 71 in the second joint body 2 are forced to rotate in relation to each other. Since the second connecting region 4a between the two passage sections 70, 71 is sealed by the first and second circumferential side seal units 4, 5, the auxiliary fluid 106a is allowed to pass through the auxiliary fluid passage 7 without leaking from a region between the auxiliary fluid passage sections 70, 71. Then, since the second joint body 2 is supported at the upper and lower ends by the bearing 13 and the bearing face 48 provided on the stationary seal ring 43 of the first circumferential side seal unit 4, the second joint body 2 is free from axial vibration. That is, there is no change in the positional relationship in the radial direction of the seal rings 43, 45 and 53, 55 in the first and second circumferential side seal units 4, 5. Thus, a good seal is secured by the circumferential side seal units 4, 5, with no fear of the auxiliary fluid leaking out of the auxiliary fluid passage 7. This arrangement eliminates the need to install many bearings to prevent axial vibration of the second joint body 2, because the stationary seal ring 43 in the first circumferential seal unit 4 serves as a bearing. The reduces the number of bearings 13 to a minimum and thus permits size reduction of the second rotary joint 101B—size in the direction of rotation axis. In addition, dish-formed plate springs which occupy less space than coil springs are used as springs 47, 57. That further reduces the size of the second rotary joint 101B.

In the aforesaid embodiments, the first and second rotary joints 101A and 101B are additionally provided with the auxiliary fluid passage 7 and the first and second circumferential seal units 4, 5 to seal the space between the relatively rotating components 70, 71 so that a plurality of fluids 106, 106a may be allowed to flow simultaneously. Needless to say, such an arrangement is not needed with rotary joints intended for exclusive use for the prime fluid 106 and also for selective or alternative use for the prime fluid 106 and other fluids. The third embodiment shown in FIGS. 6 and 7 is an example where the present invention is applied to a rotary joint for such uses.

Embodiment 3

Figure 6:
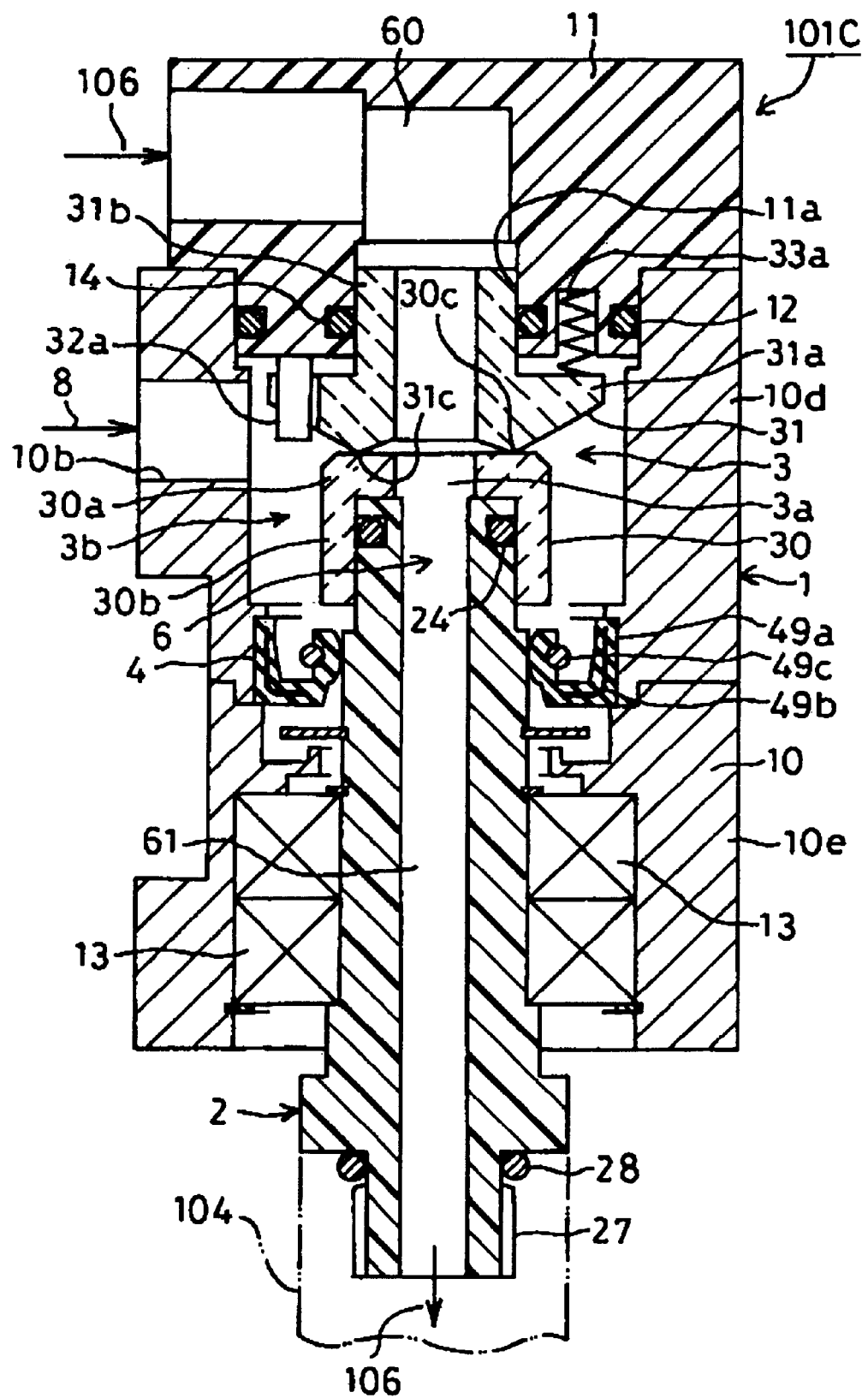
FIG. 6 is a vertical, sectional view corresponding to FIG. 1 showing another variation of the rotary joint embodying the present invention.
Figure 7:
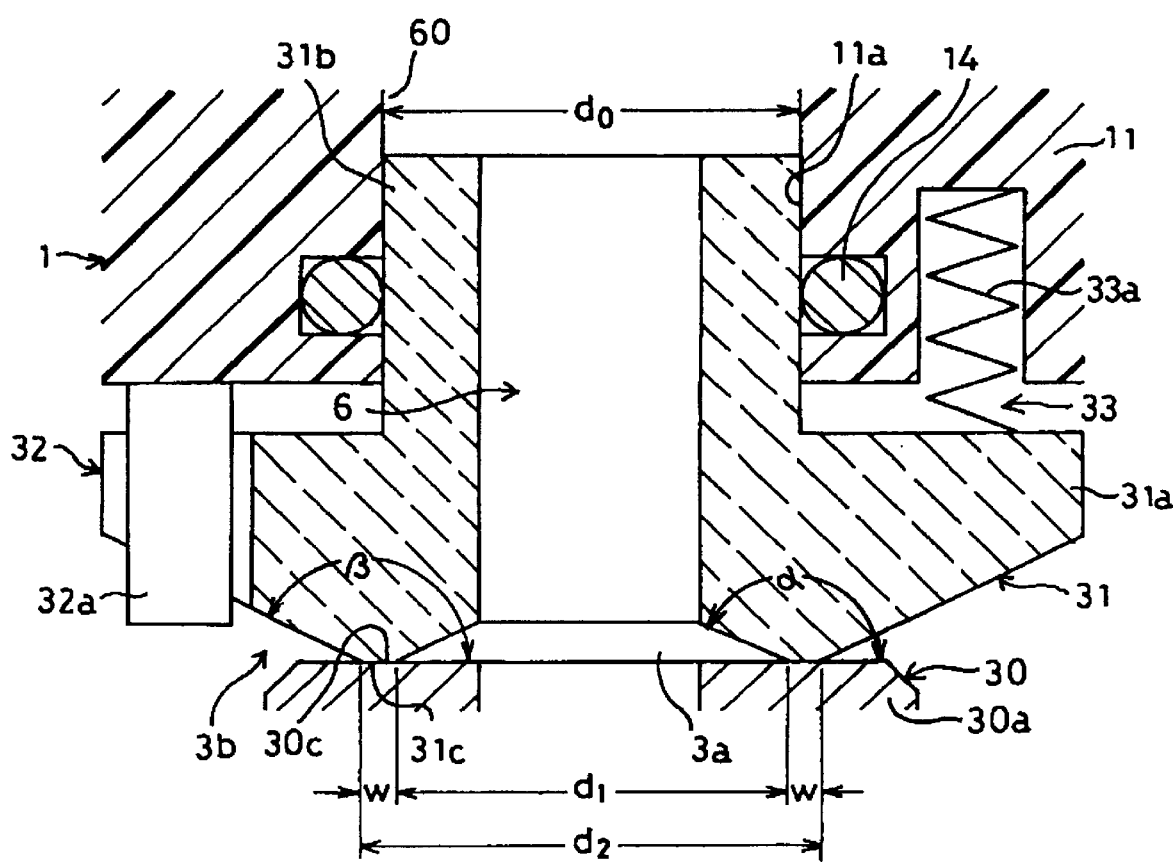
FIG. 7 is an enlarged view of a core portion of FIG. 6.

The rotary joint according to a third embodiment of the present invention the third rotary joint 101C—includes, as shown in FIGS. 6 and 7, first and second joint bodies 1, 2 connected with each other and rotatable relative to one another, a prime seal unit 3 and a circumferential side seal unit 4 placed between the two joint bodies 1, 2 and a continuous line of prime fluid passage 6 formed in the two joint bodies 1, 2. The third rotary joint 101C is of the same construction as the first rotary joint 101A or the second rotary joint 101B except for some points which will be described. Therefore, the reference numerals designating corresponding parts in FIGS. 6 and 7 are the same as those in FIGS. 1 to 5, and no description will be given of those numerals.

The first joint body 1 is made up, as shown in FIG. 6, of a side wall 10 formed from a first cylindrical body 10d and a second cylindrical body 10e linked to the lower end thereof and an end wall 11 attached on the top of the first cylindrical body 10d and closing the opening thereof.

As illustrated in FIG. 6, the second joint body 2 looks like a vertically extending cylinder, and rotatably linked to the first joint body 1 via bearings 13 placed between the portion near the lower end of the second joint body 2 and the second cylindrical body 10e of the first joint body 1. That is, the two joint bodies 1, 2 are linked to each other such that the two joint bodies 1,2 are relatively rotatable, with the axis of the second joint body 2 as relative rotation axis. At the end of the second joint body 2, a threaded edge 27, over which the polishing pad shaft is to be screwed, is formed, and an O-ring 28 to tighten up the screwing is installed.

The prime seal unit 3 is a mechanical seal of the end face contact type of the same construction as the first rotary joint 101A as shown in FIGS. 6 and 7. The unit 3 comprises a stationary seal ring 30 made of silicon carbide and provided in the second joint body 2, a movable seal ring 31 made of silicon carbide and provided in the first joint body 1 and a coil spring 33a placed between the movable seal ring 31 and the first joint body 1. This unit 3 serves as seal between the inner circumferential region of the two seal rings 30, 31—the first connecting region 3a—and the outer circumferential region—the cooling water space 3b. To further make sure that there will be no metallic contamination of prime fluids like polishing solution 106 for treatment of silicon wafer, the following features are incorporated.

First, different materials are selected properly for different parts of the rotary joint. The selection of materials is based on this. That is, the parts making up the mechanical seal, i.e. the prime seal unit 3, can be classified according to the performance, strength, and other properties required as follows:

(1) Parts that can be made of a ceramic or plastic material so as not to release metallic particles, (2) Parts made of metallic materials including alloys that can be coated with a ceramic or plastic material on the surface to contain metallic particles, (3) Parts that cannot be made of or coated with a ceramic or plastic material such that generation of metallic particles cannot be avoided, and (4) Parts such as O-rings made of elastic materials that due to their nature do not give rise to metallic particles.

With the parts under (1) and (2) such as the seal rings 30, 31 at least the areas which come into contact with the polishing solution 106 are made of materials that do not release metal particles. The parts under (3), such as coil springs 33a, are placed in the cooling water space 3b which does not come into contact with the polishing solution 106. That way, the possibility of metallic particles mixing into the polishing solution 106 is precluded.

To be specific, of the parts under (1) and (2), the seal rings 30, 31 are made of sintered silicon carbide. The end wall 11 of the first joint body 1 and the second joint body 2 where the main fluid passage sections 60, 61 are formed are made of engineering plastics such as PEEK, PES, and PC, which are excellent in work dimensional stability and heat resistance. Alternatively, they may be coated with a suitable plastic material such as PTFE on the fluid contact area. That way, those parts are not capable of releasing metallic particles on contact with the polishing solution 106 itself or its solid ingredients including abrasive grains. The O-rings which come under (4) are made of an elastic material such as fluroresin and fluororubber and naturally do not release metallic particles. The coil springs 33a and stopper pins 32a which come under (3) are made of a metallic material. But as pointed out above, those parts are placed in the cooling water space 3b, which is outside of the prime fluid passage 6, and they are not exposed to the polishing solution 106. That is, those parts cannot cause the polishing solution 106 to be contaminated with metallic particles. Unlike the coil springs 33a, the stopper pins 32a in the rotation stopper mechanism 32 can be treated the same way as the parts under (1) and (2). That way, those parts 32a could be placed in the area where they are exposed to the polishing solution 106.

Meanwhile, the seal end face 31c of the movable seal ring 31 has a function of scraping off and removing the abrasive grains that intrude between the seal end faces 30c, 31c. This function of removing stuck solid ingredients is achieved at a narrow width W in the radial direction of the annular seal end face 31c of the movable seal ring 31. It is also possible to prevent contact wearing at seal end faces 30c, 31c by minimizing the width W of the seal end face 31c, thus reducing the contact area between the seal end faces 30c, 31c.

Secondly, therefore, the radial width W of the seal end face 31c of the movable seal ring is set at 0.1 to 0.8 mm to effectively achieve the function of removing solid ingredients and the function of preventing the contact wearing. If W>0.8 mm, the seal end face 31c of the movable seal ring 31 can not work well to remove the solid ingredients and cannot effectively prevent the contact wearing of the seal end faces 30c, 31c. If W<0.1 mm, on the other hand, there will arise such problems as poor strength of the seal end face 31c of the movable seal ring 31 and excessive scraping by the seal end face 31c. Excessive scraping could destroy the lubrication film or a fluid film of the polishing solution 106 formed between the seal end faces 30c, 31c, with the result that the contact areas of the seal end faces 30c, 31c seize up. Furthermore, the contact pressure between the seal end faces 30c, 31c could rise more than necessary. That is, the contact wearing of the seal end faces 30c, 31c could not be suppressed effectively, resulting in released particles. The desired upper and lower limits of the seal end face width W are different depending on the seal conditions such as the properties, pressure and other parameters of the prime fluid 106 to be sealed. But it is preferable to set at 0.4 mm$\leq$W$\leq$0.7 mm irrespective of those seal conditions if the function of removing the solid ingredients and preventing the contact wearing is to be ensured with the lubrication film well protected. The inclination angles $\alpha$, $\beta$ of the inner and outer circumferential surfaces of the tapering portion forming the seal end face of the movable seal ring 31—the lower end of the movable seal ring 31—are set at 105 to 150 degrees in consideration of such factors as the strength of the tapering portion forming the seal end face. For easy machining of the movable seal ring 31 and in consideration of other factors, it is so set that $\alpha=\beta$, that is, $105°\leq\alpha=\beta\leq150°$.

In the meantime, the seal rings 30, 31 are made of sintered silicon carbide that is free from releasing metallic particles in contact with the polishing solution 106. But it would be possible that there would arise wear particles from the contact area of the seal rings 30, 31 in long service. Silicon carbide which is generally used as material for the seal rings 30, 31 contains heavy metals such as iron in considerable quantities. That is, the wear particles arising from the seal rings 30, 31 could contain those metallic components. If those metallic components get into and contaminate the polishing solution 106, an adverse effect will be produced on the silicon wafer.

Thirdly, in the third rotary joint 101C, therefore, that possibility is precluded by forming at least the seal end faces 30c, 31c of the seal rings 30, 31 with silicon carbide having a low metal content (referred to hereinafter as low metal content silicon carbide) whose total contents of metals like iron are not higher than 200 ppm. That way, possible metallic contamination of the polishing solution 106 is effectively prevented. In other words, if at least the seal end faces 30c, 31c of the seal rings 30, 31 are made from such a low metal content silicon carbide, the metal contents in the wear particles generated by contact between the seal rings 30, 31 can be reduced to a minimum. Coupled with the setting of the radial width W at 0.1 to 0.8 mm, preferably 0.4 to 0.7 mm, for suppressing as much as possible the release of wear particles generated by contact between the seal rings 30, 31, the use of the low metal content silicon carbide can reduce the metallic contamination of the polishing solution 106 to the extent that the wear particles arising from the contact area between the seal rings 30, 31 will have no adverse effect on the silicon wafer. To ensure that, the whole seal rings 30, 31 are made of a low content grade of silicon carbide. Or the seal end faces 30c, 31c alone are made of, that is, coated with, that material. In the present example, the whole seal rings 30, 31 are made of a low metal content grade of silicon carbide.

The surface polishing apparatus as illustrated in FIG. 10 is often switched from the positive pressure mode for polishing operation to the negative pressure or dry mode to keep the residual polishing solution from dropping on the finished wafer surface. In the mode switchover, the pressure within the prime fluid passage 6 changes with a negative pressure acting on the movable seal ring 31. With the negative pressure acting, the movable seal ring 31 would be moved away from the stationary seal ring 30, such that the contact face pressure between the seal end faces 30c, 31c is not maintained properly. That could result in the sucked residual polishing solution leaking out from between the seal end faces 30c, 31c.

Fourthly, therefore, it is so designed that $0 \leq K \leq 0.6$ is achieved, where K=the balance ratio of the prime seal unit 3 so that the contact face pressure between the seal end faces 30c, 31c is maintained at a desired level even if such a negative pressure acts. To be more specific, the outside diameter $d_0$ of the retainer portion 31b of the movable seal ring 31, and the inside and outside diameters $d_1$ and $d_2$ of the seal end face 31c are so set that $0 \leq K \leq 0.6$ is achieved, with $(d_2-d_1)/2(=w)$ being 0.1 to 0.8 mm, preferably 0.4 to 0.7 mm so that the seal end faces 30c, 31c are kept in proper contact with each other regardless of changes in pressure and other conditions as, for instance, when the prime fluid passage 6 is switched from the blasting operation to the negative pressure mode for suction.

The balance ratio K can be specified by the diameters of the relatively rotating and sliding contact area between the two seal rings 30, 31, that is, the inside and outside diameter $d_1$, $d_2$ of the seal end face 31c, and the diameter of the back pressure acting area of the movable seal ring 31 movable in the axial direction, that is, the outside diameter $d_0$ of the retainer portion 31b of the movable seal ring 31. For design purposes, the ratio K can be given as follows: $K=(d_0)^2-(d_1)^2)/((d_2)^2)-(d_1)^2)$.

That is, the apparent face pressure (thrust) Pa acting on the sliding contact areas of the two seal rings 30, 31 is produced by the fluid pressure (back pressure) P acting on the movable seal ring 31 to thrust the same toward the stationary seal ring 30 and the pressure (spring pressure) F of the thrusting mechanism 32. The apparent face pressure (thrust) Pa is given in the following equation: $Pa=(\pi/4)((d_0)^2-(d_1)^2)P/(\pi/4)((d_2)^2-(d_1)^2)+(\pi/4)((d_2)^2-(d_1)^2)F/\pi/4)((d_2)^2-(d_1)^2)=((d_2)^2-(d_0)^2)/((d_2)^2-(d_1)^2))P+F$. In this equation, the coefficient "$((d_0)^2-(d_1)^2)/((d_2)^2-(d_1)^2)$" is the balance ratio K.

Therefore, the balance ratio K, which is $((d_0)^2-(d_1)^2)/((d_2)^2-(d_1)^2)$, is inevitably determined by the inside and outside diameter $d_1$, $d_2$ of the seal end face 31c and the outside diameter $d_0$ of the retainer portion 31b. By designing $d_0$, $d_1$, $d_2$ so that $0 \leq K \leq 0.6$ is achieved, it is possible to keep the contact pressure of the two seal rings 30, 31 at a proper level to produce a good seal effect without much changes taking place in the thrust Pa at the relatively rotating and sliding contact area of the seal end faces 30c, 31c irrespective of the pressure in the prime fluid passage 6. Otherwise, problems would arise. If K<0, the spring pressure F would have to be set higher than necessary, for example. If K>0.6, then the contact pressure between the two seal rings 30, 31 would be insufficient and the polishing solution 106 could leak out of the prime fluid passage 6 in discharging the residual polishing solution, that is, in the negative pressure or dry mode. With $0 \leq K \leq 0.6$, however, the polishing solution 106 can be sealed effectively regardless of the pressure within the prime fluid passage 6, that is, whether the passage 6 is under the negative pressure with a negative pressure acting.

The four features just described are applicable to the first and second rotary joints 101A and 101B.

It is noted that in the third rotary joint 101C, such a mechanical seal as used in the first and second rotary joints 101A, 101B is not used as circumferential side seal unit 4. The seal unit 4 used in this rotary joint 101C is made up, as shown in FIG. 6, of: a seal ring 49a of an elastic material such as rubber which is fitted into, and held in, the inner circumferential surface of the first cylinder body 10d, and pressed against the outer circumferential surface of the second joint body 2; a reinforcing metal piece 49b embedded in the sealing ring 49a; and a garter spring 49c to secure a required strength with which the inner radial portion of the seal ring is pressed against the second joint body 2.

Embodiment 4

Figure 8:
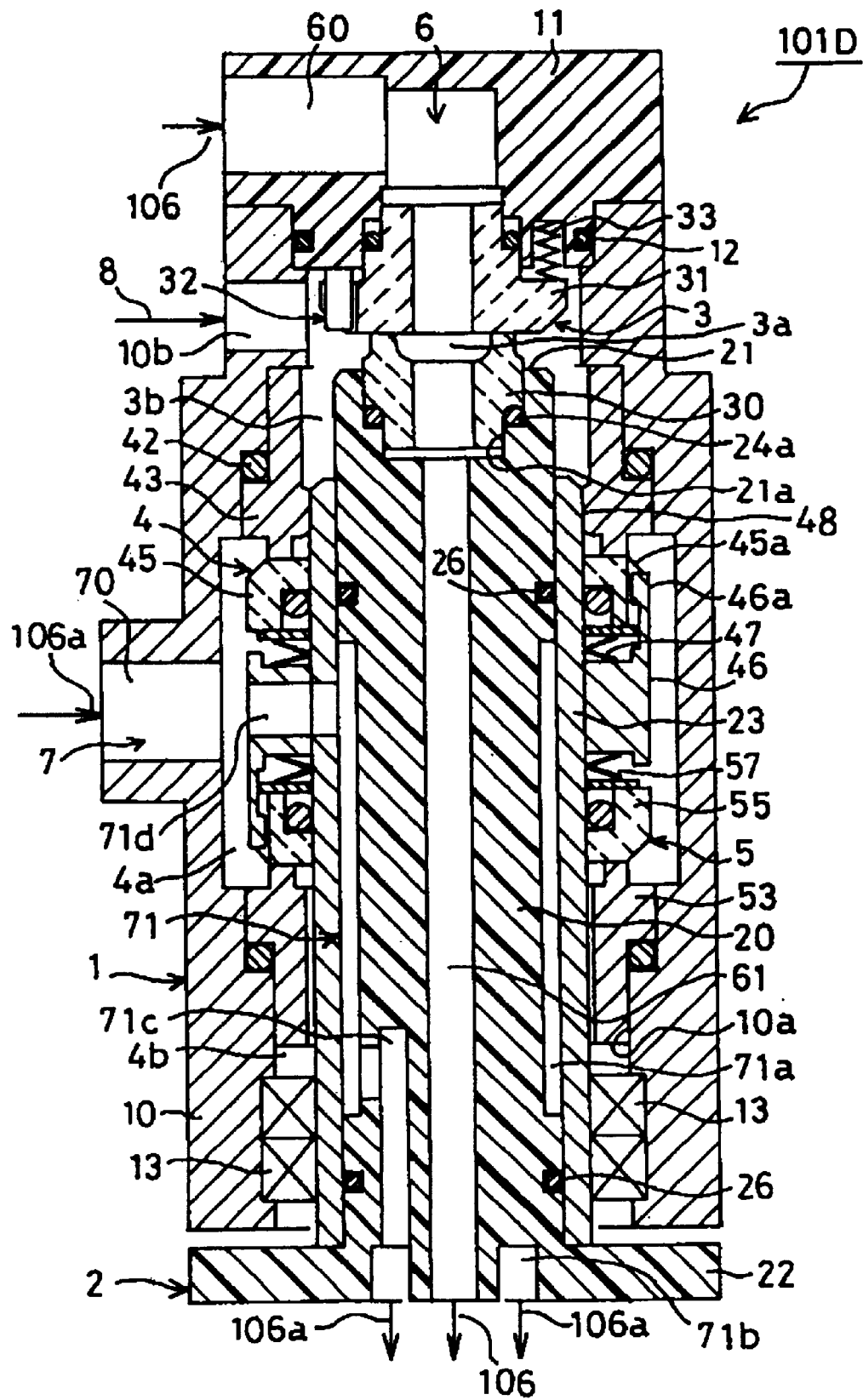
FIG. 8 is a vertical, sectional view corresponding to FIG. 1 showing still another variation of the rotary joint embodying the present invention.
Figure 9:
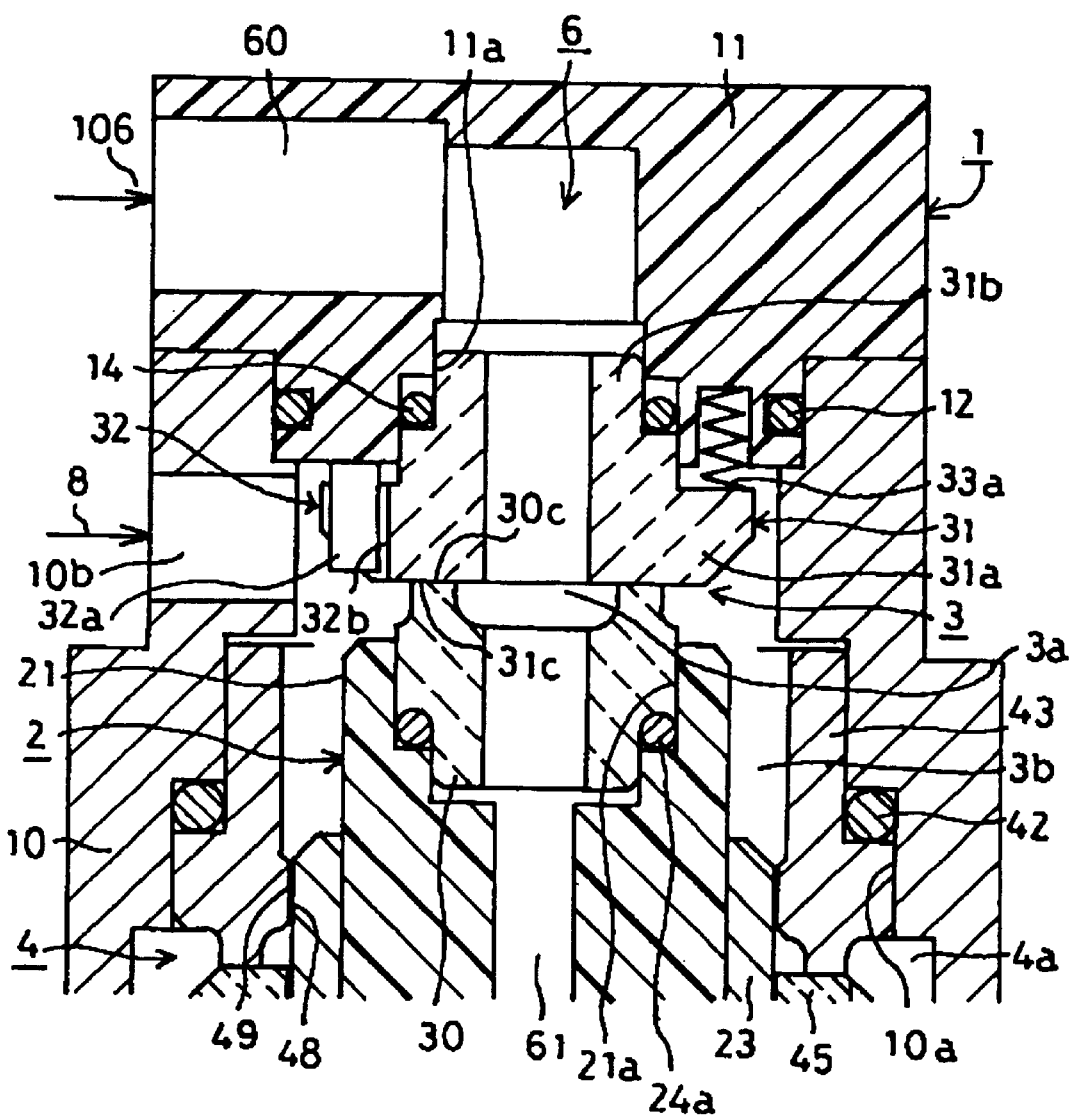
FIG. 9 is an enlarged view of a core portion of FIG. 8.

FIG. 8 and FIG. 9 show a fourth embodiment of the present invention. The rotary joint in this embodiment—the fourth rotary joint 101D—is identical in construction with the first, second and third rotary joints 101A, 101B, 101C except for some points which will be described. Therefore, the reference numerals designating corresponding parts in FIGS. 8 and 9 are the same as those in FIGS. 1 to 7, and no description will be given of those numerals.

In the fourth rotary joint 101D, the stationary seal ring 30 is formed in the shape of a cylinder as shown in FIGS. 8 and 9. Concentric with the second joint body 2 with its axis of rotation as center, the stationary seal ring 30 is fitted into, and held in, a recess formed in the seal ring retainer portion 21. On the top of the stationary seal ring 30 is formed the seal end face 30c, an annular smooth surface perpendicular to the axis. The stationary seal ring 30 is fitted into the recess 21a with the top end portion slightly protruding out and with an O-ring 24a placed in the fitted portion as secondary seal. Like the O-ring 14, the O-ring 24a is made preferably of fluororesin or fluororubber.

Since the stationary seal ring 30 must be closely fitted into the second joint body 2 unlike the rotary seal rings 45, 55 in the circumferential side seal units 4, 5, machining with low precision or shrinkage fitting technique could result in residual strain, shrinkage fitting strain or the like which could affect the seal function. The rotary joint 101C has no problem of that kind, since the stationary seal ring 30 is cylindrical in shape with a major portion fitted into the recess 21a of the second joint body 2.

The movable seal ring 31 is composed, as shown in FIGS. 8 and 9, of a ring-formed main part 31a and a cylindrical retainer portion 31b integrally formed therewith. Fitted into a retention hole 11a provided in the end wall 11, the movable seal ring 31 is held in the first joint body concentrically opposed to the stationary seal ring 30 and movable in the axial direction. The fitting area between the retainer portion 31b and the retention hole 11a is secondarily sealed with an O-ring 14. The outside diameter of the main part 31a is larger than the outside diameter of the retainer portion 31b by a specific size. The lower end face of the main part 31a is the seal end face 31c, an annular smooth surface perpendicular to the axis. It is noted that the factors such as the dimensions of the respective component parts including the diameters of the seal end faces 30a, 31c are selected so that a proper seal function may be maintained by the seal end faces 30a, 31c even when the pressure relation between the regions 3a, 3b is reversed, for instance, when the first fluid passage 6 is switched to the negative pressure or dry mode. That is, the balance ratio K is so set that $0 \leq K \leq 0.6$ is achieved. It is also noted that the stationary seal ring 43 in the first circumferential seal unit 4 has a bearing face 48 that serves as a bearing for the second joint body 2 as in the second rotary joint 101B.

It is understood that the present invention is not limited to the embodiments just described but may be changed or modified without departing from the basic principle of the present invention.

For example, the rotary joints of the present invention can be so configured that three or more kinds of fluids can simultaneously flow through their respective passages. While it is structurally impossible to build more than one prime fluid passage 6, the number of auxiliary fluid passages 7 can be freely increased by providing additional circumferential side seal units 4, 5. In that case, it is desirable to have one circumferential side seal unit serve as a seal between two second connecting regions 4a, to diminish the size of the rotary joint 101. This feature is adopted in the embodiments described above. That is, the first circumferential side seal unit 4 is used as seal for the cooling water space 3b and the second connecting region 4a. In case N lines of auxiliary fluid passages 7 are needed to have (N+1) kinds of fluids including the main fluid flow, N spaces of second connecting regions 4a are needed. Those N spaces can be formed by providing (N+1) pieces of circumferential side seal units side by side.

While it is desirable to provide a bearing face 48 in the stationary seal ring remotest from the bearing 13 (in the foregoing examples, the stationary seal ring 43 of the first circumferential seal unit 4), it is possible to form the bearing face 48c in another seal ring or a plurality of seal rings as well (in the above example, the stationary seal ring 53 of the seal unit 5).

In the prime seal unit 3, needless to say, the stationary seal ring 30 can be provided in the first joint body 1 and the movable seal ring 31 (and its auxiliary parts 32, 33) in the second joint body 2—unlike the arrangement in the foregoing examples.

The rotary joints of the present invention are also possible to apply to surface polishing apparatuses other than that illustrated in FIG. 10. An example is an apparatus so constructed that the rotary table is a polishing pad to blast polishing solution and the surface of silicon wafer is brought into contact with that pad table. The rotary joints of the present invention can also be used for a variety of equipment for treating and handling other slurry fluids, corrosive fluids or the like than the polishing solution 106. The rotary joints of the present invention are especially suitable for slurry fluids containing solid ingredients like abrasive grains.

Depending on the properties and other conditions of the auxiliary fluid 106a to be sealed, a non-contact type mechanical seal—a gas seal—may be used as circumferential side seal unit to seal one or more second connecting regions 4a.

The fluid contact area in the prime fluid passage 6 is made of a material that does not release metallic components such as metal ions in case the prime fluid 106 is pure water, polishing solution or the like for treatment of silicon wafer. Such materials include engineering plastics, corrosion-resistant plastics and silicon carbide. As mentioned, the portion where the prime fluid passage 6 is formed alone may be made of those materials. Or the fluid contact area alone may be built of such materials as by coating. Or the whole joint bodies 1, 2 or the whole rotary joint may be made of those materials. In case the whole joint or the major part thereof is made of a plastic material, it is desirable to select materials whose mechanical properties, especially bending strength, are higher than a specific level. Generally, it is desirable to use materials such as PEEK and PES with a bending strength of not lower than 1,000 kg/cm$^2$.

The present invention is suitable for apparatuses and equipment handling prime fluids 106 such as slurry fluid containing hard solid ingredients like abrasive grains and corrosive liquids. Especially, in the case of a highly corrosive prime fluid 106, the fluid contact area like the inner wall surface of the passage sections 60, 61 of the prime fluid passage 6 may be coated with such corrosion-resistant plastics as PTFE, PFA and FER It is desirable to make the seal rings 30, 31 of silicon carbide. Those seal rings 30, 31 also may be formed with such engineering plastic materials.

The seal rings of the prime seal unit 3 and the seal rings of the respective circumferential side seal units 4,5 also may be made of low metal content silicon carbide of a total metal content of not higher than 200 ppm. Those seal rings also may be built with common sintered silicon carbide with the seal end faces alone made with a low metal content grade of silicon carbide as by coating with a chemical vapor deposition layer of silicon carbide of such a grade.

The material for the seal rings 30, 31 in the prime seal unit 3 may be selected among aluminum oxide, fluororesin and PEEK in addition to silicon carbide depending on the sealing conditions. The seal rings 30, 31 are made of the same material or different materials. The material for the stationary seal rings 43, 53 and the rotary seal rings 45, 55 in the circumferential side seal units 4, 5 may be selected from among silicon carbide, aluminum oxide, fluororesin, PEEK, and carbon. Of them, one material or a combination of two or more materials may be used, as well as the aforesaid combination of carbon and silicon carbide. It is also noted that in case silicon carbide is picked up as material for seal rings, it is possible to use commonly used sintered materials depending on the sealing conditions in addition to the aforesaid low metal content silicon carbide. The suitable crystal structure may be either of the following: α type polycrystal, β type polycrystal or a mixture of those two types. But it is desirable to have a vapor deposition coated layer of the β type silicon carbide polycrystal on the end face of the aforesaid sintered body.

The fluororubber to form O-rings 12, 24 etc. can be selected from among vinylidene fluorides, acrylate fluorides, propylene hexafluorides, and their copolymers.

What is claimed is:

1. A rotary joint comprising:
   a first joint body;
   a second joint body rotatably connected to the first joint body;
   a prime seal unit which is a mechanical seal placed between opposed end portions arranged in the axial direction of the two joint bodies, the prime seal unit comprising (1) a stationary seal ring fixed concentrically to one of the opposed end portions with the axis of rotation as center, (2) a movable seal ring movable in the axial direction and held in the other of the opposed end portions concentrically with the stationary seal ring, (3) a rotation stopper mechanism provided on the outer circumferential side of the movable seal ring to keep the movable seal ring from relatively rotating while allowing the movable seal ring to move in the axial direction, and (4) a thrusting mechanism to press the movable seal ring toward the stationary seal ring, thereby providing a seal between an inner circumferential region inside the seal rings and an outer circumferential region outside of the seal rings by the sliding contact of the two relatively rotating seal rings, wherein one of the two seal rings has a lower end portion that is tapered and sharpened; and
   a continuous line of prime fluid passage made up of the inner circumferential region within the two seal rings, a first prime fluid passage section passing through the first joint body and leading into said inner circumferential region and a second prime fluid passage passing through the second joint body and leading into said inner circumferential region.

2. The rotary joint as defined in claim 1, wherein one of the opposed seal end faces of the two seal rings in the prime seal unit is an annular face 0.1 to 0.8 mm in width in the radial direction.

3. The rotary joint as defined in claim 1 or claim 3, wherein the inner and outer circumferential surfaces of the tapered portion of the seal ring form circular cone surfaces which are at an identical angle of 105 to 150 degrees with respect the seal end face.

4. The rotary joint as defined in claim 1, wherein the prime seal unit is a mechanical seal so built that $0 \leq K \leq 0.6$ is achieved, where K is the balance ratio.

5. The rotary joint as defined in claim 1, wherein the respective seal rings in the prime seal unit are made of materials selected from among silicon carbide, aluminum oxide, fluororesin, and PEEK.

6. The rotary joint as defined in claim 5, wherein at least the seal end face of each seal ring is formed with silicon carbide.

7. The rotary joint as defined in claim 5 or claim 6, wherein said silicon carbide contains a total metal content of not higher than 200 ppm.

8. The rotary joint as defined in claim 1, wherein the stationary seal ring is cylindrical in shape and fitted and capped over one end portion of the joint body.

9. The rotary joint as defined in claim 1, wherein the stationary seal ring is cylindrical in shape and fitted and held into a recess formed in one end portion of the joint body.

10. The rotary joint as defined in claim 1, wherein the prime fluid passage is for liquid to pass through, and wherein the fluid contact area in said prime fluid passage is made of a material that will not release metal components in contact with the liquid.

11. The rotary joint as defined in claim 1, wherein a circumferential side seal unit is provided between the outer circumferential surface of the second joint body and the inner circumferential surface of the first joint body surrounding said second joint body concentrically, whereby the outer circumferential region outside of said prime seal rings is sealed by said circumferential side seal unit and said prime seal unit and is used as cooling water space to supply cooling water to cool the contact area of the seal rings.

12. The rotary joint as defined in claim 11, wherein the second joint body is provided with an inlet port and an outlet port, both opening into said cooling water space, so as to supply and circulate the cooling water.

13. The rotary joint as defined in claim 1, wherein a plurality of circumferential seal units are provided side by side in the axial direction between the outer circumferential surface of the second joint body and the inner circumferential surface of the first joint body surrounding said second joint body concentrically, thereby forming a connecting region sealed with the neighboring circumferential side seal units between said outer and inner circumferential surfaces of said joint bodies, and wherein there are provided first and second auxiliary fluid passage sections in the joint bodies which do not cross said prime fluid passage sections, thereby forming a continuous line of auxiliary fluid passage made up of the two auxiliary fluid passage sections and said connecting region.

14. The rotary joint as defined in claim 11 or claim 13, wherein the circumferential seal unit is a mechanical seal comprising a stationary seal ring fixed to the inner circumferential surface of the first joint body and a rotary seal ring movable in the axial direction, held in the outer circumferential surface of the second joint body concentrically with the stationary seal ring and pressed against the stationary seal ring.

15. The rotary joint as defined in claim 11 or claim 13, wherein the inner circumferential surface of the stationary seal ring in at least one circumferential side seal unit serves as a ring-formed bearing face which fits over and rotatably holds the outer circumferential surface of the second joint body.

16. The rotary joint as defined in claim 11 or claim 13, wherein the circumferential seal unit is provided with a plate spring elastically changeable in form in the axial direction for urging the rotary seal spring against the stationary seal spring.

17. The rotary joint as defined in claim 4, wherein the respective seal rings in the circumferential seal units are made of materials selected from among silicon carbide, aluminum oxide, fluororesin, PEEK, and carbon.

18. The rotary joint as defined in claim 17, wherein, of the two seal rings in said circumferential seal units, one is made of silicon carbide and the other is made of carbon.

19. The rotary joint as defined in claim 13, wherein at least the inner walls of the auxiliary fluid passage sections in the respective joint bodies are formed with a plastic material inert in and resistant to the auxiliary fluid that flows through said auxiliary fluid passage sections.

20. The rotary joint as defined in claim 1, claim 11, or claim 13, wherein the O-ring secondarily sealing the contact area between the seal ring and the joint body is made of fluororubber or fluororesin.

21. A rotary joint comprising:

a first joint body;

a second joint body rotatably connected to the first joint body;

a prime seal unit which is a mechanical seal placed between opposed end portions arranged in the axial direction of the two joint bodies, the prime seal unit comprising (1) a stationary seal ring fixed concentrically to one of the opposed end portions with the axis of rotation as center, (2) a movable seal ring movable in the axial direction and held in the other of the opposed end portions concentrically with the stationary seal ring, (3) a rotation stopper mechanism provided on the outer circumferential side of the movable seal ring to keep the movable seal ring from relatively rotating while allowing the movable seal ring to move in the axial direction, and (4) a thrusting mechanism to press the movable seal ring toward the stationary seal ring, thereby providing a seal between an inner circumferential region inside the seal rings and an outer circumferential region outside of the seal rings by the sliding contact of the two relatively rotating seal rings, wherein the seal rings in the prime seal unit are made of silicon carbide with a total metal content of not higher than 200 ppm; and a continuous line of prime fluid passage made up of the inner circumferential region within the two seal rings, a first prime fluid passage section passing through the first joint body and leading into said inner circumferential region and a second prime fluid passage passing through the second joint body and leading into said inner circumferential region.

22. A rotary joint comprising:

a first joint body;

a second joint body rotatably connected to the first joint body;

a prime seal unit which is a mechanical seal placed between opposed end portions arranged in the axial direction of the two joint bodies, the prime seal unit comprising (1) a stationary seal ring fixed concentrically to one of the opposed end portions with the axis of rotation as center, (2) a movable seal ring movable in the axial direction and held in the other of the opposed end portions concentrically with the stationary seal ring, (3) a rotation stopper mechanism provided on the outer circumferential side of the movable seal ring to keep the movable seal ring from relatively rotating while allowing the movable seal ring to move in the axial direction, and (4) a thrusting mechanism to press the movable seal ring toward the stationary seal ring, thereby providing a seal between an inner circumferential region inside the seal rings and an outer circumferential region outside of the seal rings by the sliding contact of the two relatively rotating seal rings; and a continuous line of prime fluid passage made up of the inner circumferential region within the two seal rings, a first prime fluid passage section passing through the first joint body and leading into said inner circumferential region and a second prime fluid passage passing through the second joint body and leading into said inner circumferential region, wherein the prime fluid passage is for liquid to pass through, and wherein the fluid contact area in said prime fluid passage is made of a material that will not release metal components in contact with the liquid.

23. A rotary joint comprising:

a first joint body;

a second joint body rotatably connected to the first joint body;

a prime seal unit which is a mechanical seal placed between opposed end portions arranged in the axial direction of the two joint bodies, the prime seal unit comprising (1) a stationary seal ring fixed concentrically to one of the opposed end portions with the axis of rotation as center, (2) a movable seal ring movable in the axial direction and held in the other of the opposed end portions concentrically with the stationary seal ring, (3) a rotation stopper mechanism provided on the outer circumferential side of the movable seal ring to keep the movable seal ring from relatively rotating while allowing the movable seal ring to move in the axial direction, and (4) a thrusting mechanism to press the movable seal ring toward the stationary seal ring, thereby providing a seal between an inner circumferential region inside the seal rings and an outer circumferential region outside of the seal rings by the sliding contact of the two relatively rotating seal rings;

a continuous line of prime fluid passage made up of the inner circumferential region within the two seal rings, a first prime fluid passage section passing through the first joint body and leading into said inner circumferential region and a second prime fluid passage passing through the second joint body and leading into said inner circumferential region; and a plurality of circumferential seal units provided side by side in the axial direction between the outer circumferential surface of the second joint body and the inner circumferential surface of the first joint body surrounding said second joint body concentrically, thereby forming a connecting region sealed with the neighboring circumferential side seal units between said outer and inner circumferential surfaces of said joint bodies, and wherein there are provided first and second auxiliary fluid passage sections in the joint bodies which do not cross said prime fluid passage sections, thereby forming a continuous line of auxiliary fluid passage made up of the two auxiliary fluid passage sections and said connecting region.

* * * * *